LLLL 
US012473962B2

(12) United States Patent
Mock et al.

(10) Patent No.: US 12,473,962 B2
(45) Date of Patent: Nov. 18, 2025

(54) THREE-SPEED TRANSMISSION FOR AN ELECTRIC DRIVE SYSTEM

(71) Applicant: ALLISON TRANSMISSION, INC., Indianapolis, IN (US)

(72) Inventors: Isaac Mock, Martinsville, IN (US); Drew A. Crafton, Mooresville, IN (US); Nayan V. Patel, Avon, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 18/475,475

(22) Filed: Sep. 27, 2023

(65) Prior Publication Data
US 2024/0093763 A1 Mar. 21, 2024

Related U.S. Application Data

(63) Continuation of application No. 17/831,585, filed on Jun. 3, 2022, now Pat. No. 11,828,351.

(51) Int. Cl.
*F16H 3/62* (2006.01)
*B60K 1/00* (2006.01)
(Continued)

(52) U.S. Cl.
CPC ............. *F16H 3/62* (2013.01); *B60K 1/00* (2013.01); *B60K 17/08* (2013.01); *F16H 3/78* (2013.01);
(Continued)

(58) Field of Classification Search
CPC ...... F16H 3/62; F16H 3/78; F16H 2200/0021; F16H 2200/0039; F16H 2200/0091;
(Continued)

(56) References Cited

U.S. PATENT DOCUMENTS 2,180,671 A * 11/1939 Fleischel .................. F16H 3/66
475/141
2,806,388 A 9/1957 Simpson
(Continued)

FOREIGN PATENT DOCUMENTS

CN 1400409 10/2014
CN 106696690 A 5/2017
(Continued)

OTHER PUBLICATIONS

English abstract for CN 106696690 A obtained from Googe Patents on Apr. 13, 2023.

*Primary Examiner* — Sherry L Estremsky
(74) *Attorney, Agent, or Firm* — Woodard Emhardt Henry Reeves & Wagner LLP

(57) ABSTRACT

A drive system for a vehicle that includes a transmission with three forward and three reverse gears. The transmission is optionally coupled to an electric motor as part of a fully electric or hybrid drive system. The transmission optionally includes a first and a second planetary gearset, a first and a second brake, and a clutch. The system may be configured to separately engage the first or second brakes, or the clutch, and may be arranged to provide separate gear ratios as each is engaged and disengaged separately. A single electric motor may be provided with a single transmission, or multiple electric motors may be included to individually drive multiple separate tires, tracks, or other ground engaging elements. Single or multiple motors may be arranged upstream or downstream of the transmission, and they may be aligned parallel with or perpendicular to a drive axle.

26 Claims, 19 Drawing Sheets

(51) Int. Cl.
  *B60K 17/08* (2006.01)
  *F16H 3/78* (2006.01)
(52) U.S. Cl.
  CPC ............................ *B60K 2001/001* (2013.01);
    *F16H 2200/0021* (2013.01); *F16H 2200/0039*
    (2013.01); *F16H 2200/0091* (2013.01); *F16H
    2200/2007* (2013.01); *F16H 2200/2038*
    (2013.01); *F16H 2200/2064* (2013.01); *F16H
    2200/2094* (2013.01)
(58) Field of Classification Search
  CPC ..... F16H 2200/2007; F16H 2200/2038; F16H
    2200/2064; F16H 2200/2094; B60K 1/00;
    B60K 17/08; B60K 2001/001
  USPC .................................. 475/314, 320, 326, 280
  See application file for complete search history.

(56) References Cited

U.S. PATENT DOCUMENTS

| | | | |
|---|---|---|---|
| 2,856,795 A | | 10/1958 | Simpson |
| 2,914,967 A | * | 12/1959 | Simpson .................. F16H 3/66 |
| | | | 475/285 |
| 2,939,341 A | * | 6/1960 | Evernden ................ F16D 67/00 |
| | | | 475/54 |
| 3,946,623 A | | 3/1976 | Murakami et al. |
| 4,019,406 A | | 4/1977 | Herr |
| 4,046,031 A | | 9/1977 | Ott |
| 4,483,215 A | * | 11/1984 | Ishimaru ............... F16H 47/085 |
| | | | 475/284 |
| 4,653,348 A | | 3/1987 | Hiraiwa |
| 4,722,242 A | | 2/1988 | Miura |
| 5,194,055 A | * | 3/1993 | Oshidari ................. F16H 3/666 |
| | | | 475/281 |
| 5,419,406 A | | 5/1995 | Kawamoto et al. |
| 5,924,951 A | | 7/1999 | Winzeler et al. |
| 8,522,634 B2 | | 9/2013 | Bridges |
| 8,870,712 B2 | | 10/2014 | Steinborn et al. |
| 9,005,071 B2 | | 4/2015 | Smemo et al. |
| 9,254,740 B2 | | 2/2016 | Lamperth |
| 9,321,342 B2 | | 4/2016 | Liu et al. |
| 9,447,848 B2 | | 9/2016 | Beck et al. |
| 9,707,834 B2 | | 7/2017 | Lee et al. |
| 10,093,168 B2 | | 10/2018 | Hays et al. |
| 10,408,309 B2 | | 9/2019 | Beck et al. |
| 10,598,257 B2 | * | 3/2020 | Eo .............................. F16H 3/66 |
| 10,807,466 B1 | | 10/2020 | Haka et al. |
| 10,882,389 B2 | | 1/2021 | Kucharski |
| 11,124,064 B2 | | 9/2021 | Kaltenbach et al. |
| 11,149,833 B2 | | 10/2021 | Maguire et al. |
| 11,198,356 B2 | | 12/2021 | Brammer et al. |
| 11,320,025 B2 | | 5/2022 | Ye et al. |
| 11,338,672 B2 | | 5/2022 | Varela |
| 11,828,351 B1 | | 11/2023 | Mock et al. |
| 2004/0121877 A1 | | 6/2004 | Lee et al. |
| 2005/0023056 A1 | | 2/2005 | Harrup et al. |
| 2007/0093342 A1 | | 4/2007 | Pesiridis et al. |
| 2009/0118060 A1 | | 5/2009 | Kirkwood et al. |
| 2011/0027105 A1 | | 2/2011 | Haupt et al. |
| 2012/0291646 A1 | | 11/2012 | Fan Chiang et al. |
| 2014/0221149 A1 | | 8/2014 | Wilton et al. |
| 2014/0349802 A1 | | 11/2014 | Steiner et al. |
| 2016/0091070 A1 | | 3/2016 | Park et al. |
| 2017/0175855 A1 | | 6/2017 | Etchason |
| 2018/0119784 A1 | | 5/2018 | Cui |
| 2018/0134140 A1 | | 5/2018 | Brehmer et al. |
| 2018/0172124 A1 | | 6/2018 | Valente et al. |
| 2021/0252974 A1 | | 8/2021 | Nakashima |
| 2021/0291646 A1 | | 9/2021 | Lorenz et al. |
| 2021/0372506 A1 | | 12/2021 | McGrew, Jr. et al. |
| 2022/0034385 A1 | | 2/2022 | Beaudoin |
| 2022/0227370 A1 | | 7/2022 | Desmeules et al. |
| 2023/0392673 A1 | | 12/2023 | Mock et al. |

FOREIGN PATENT DOCUMENTS

| | | | | |
|---|---|---|---|---|
| DE | 102010045350 | | 3/2012 | |
| DE | 102017004898 A1 | * | 11/2018 | |
| DE | 102017011401 A1 | * | 6/2019 | ............... B60K 1/00 |
| DE | 102018122936 A1 | | 3/2020 | |
| DE | 102018131492 A1 | | 6/2020 | |
| DE | 102019206545 A1 | | 11/2020 | |
| DE | 102019119946 B3 | | 12/2020 | |
| GB | 910653 | | 11/1962 | |
| JP | 2785325 B2 | | 8/1998 | |
| WO | WO 2012053142 | | 4/2012 | |

* cited by examiner

THREE-SPEED TRANSMISSION FOR AN ELECTRIC DRIVE SYSTEM

CROSS-REFERENCE TO RELATED APPLICATION

This application is a continuation of U.S. patent application Ser. No. 17/831,585 filed Jun. 3, 2023, which is hereby incorporated by reference.

BACKGROUND

With the increase in fully electric and hybrid drive systems has come a corresponding push to develop more efficient drivetrain components. Earlier transmission designs, for example, were generally highly optimized for internal combustion engines which have markedly different speed and torque curves in comparison with electric motors. Using an electric motor as a primary power source thus creates new challenges and provides new opportunities for simpler, easier to operate, and more reliable transmission designs with fewer wear parts that are potentially smaller, lighter, and easier to manufacture.

SUMMARY

Disclosed is a drive system for a fully electric or hybrid drive system that optionally includes a transmission with a first and a second planetary gearset that may include a sun gear, a carrier with one or more planetary gears, and a ring gear. The carrier of the first planetary gearset is optionally coupled to the ring gear of the second planetary gearset, and the ring gear of the first planetary gearset is optionally coupled to the sun gear of the second planetary gearset. In another aspect, an input shaft receiving power from an electric motor is optionally coupled to the sun gear of the first planetary gearset. In the alternative, a hybrid electric motor and internal combustion engine configuration may also be used to provide power to the input shaft.

In another aspect, the drive system optionally includes a first brake operable to selectively couple the carrier of the second planetary gearset to ground. A second brake operable to selectively couple the ring gear of the first planetary gearset and the sun gear of the second planetary gearset to ground may also be provided. A clutch may also be included that is operable to selectively couple the input shaft to the first and second planetary gearsets. The clutches and brakes of the present disclosure may be any suitable interruptible connection such as a friction clutch or brake, a dog clutch, selectable one way clutch, synchronizer, or other such device. An output shaft may be included that is coupled to the carrier of the first planetary gearset and the ring gear of the second planetary gearset. The output shaft of the drive system may be coupled to a drive axle configured to deliver torque to a ground engaging element such as a tire, belt, track, etc.

In another aspect, the a clutch may be operable to selectively couple the input shaft to the first and second planetary gearsets to provide a 1:1 gear ratio between the input shaft and the output shaft. In another aspect, the output shaft may be aligned axially on a common axis with the electric motor that is also perpendicular to the drive axle.

In another aspect, the transmission is optionally mounted downstream of the motor. In the alternative, the transmission may be mounted upstream of the motor. The output shaft may, for example, pass through the input shaft and the electric motor to engage with the drive axle. The output shaft may extend from the transmission to engage the drive axle. In another possible configuration, the drive axle may pass through a housing of the transmission and the output shaft may be contained within the housing of the transmission. In another aspect, the drive axle optionally extends away from the transmission housing to engage one or two ground engaging elements. The input shaft and the drive axle may rotate on separate axes of rotation that are parallel to each other.

Also disclosed is a drive system with a first and a second electric motor providing torque separately to a first and a second transmission that are separate from one another. Torque is optionally transmitted from the separate motors via a first and a second input shaft coupling the first electric motor to the first transmission, and the second electric motor to the second transmission of the present disclosure.

The output shaft of the first transmission is optionally coupled to a first ground engaging element, and the output shaft of the second transmission is optionally coupled to a second separate ground engaging element t. In another aspect, the first and second output shafts may be rotatable around a common axis of rotation, or around separate and distinct axes of rotation that may be substantially parallel with the drive axle, or substantially perpendicular to it. Each of the separate motors may be independently coupled to a separate ground engaging element.

In another aspect, the first transmission is optionally mounted downstream of the first motor, and the second transmission is optionally mounted downstream of the second motor. In another example, the first transmission may be mounted upstream of the first motor, and the second transmission may be mounted upstream of the second motor.

Further forms, objects, features, aspects, benefits, advantages, and embodiments of the present invention will become apparent from a detailed description and drawings provided herewith.

DETAILED DESCRIPTION

Figure 1:
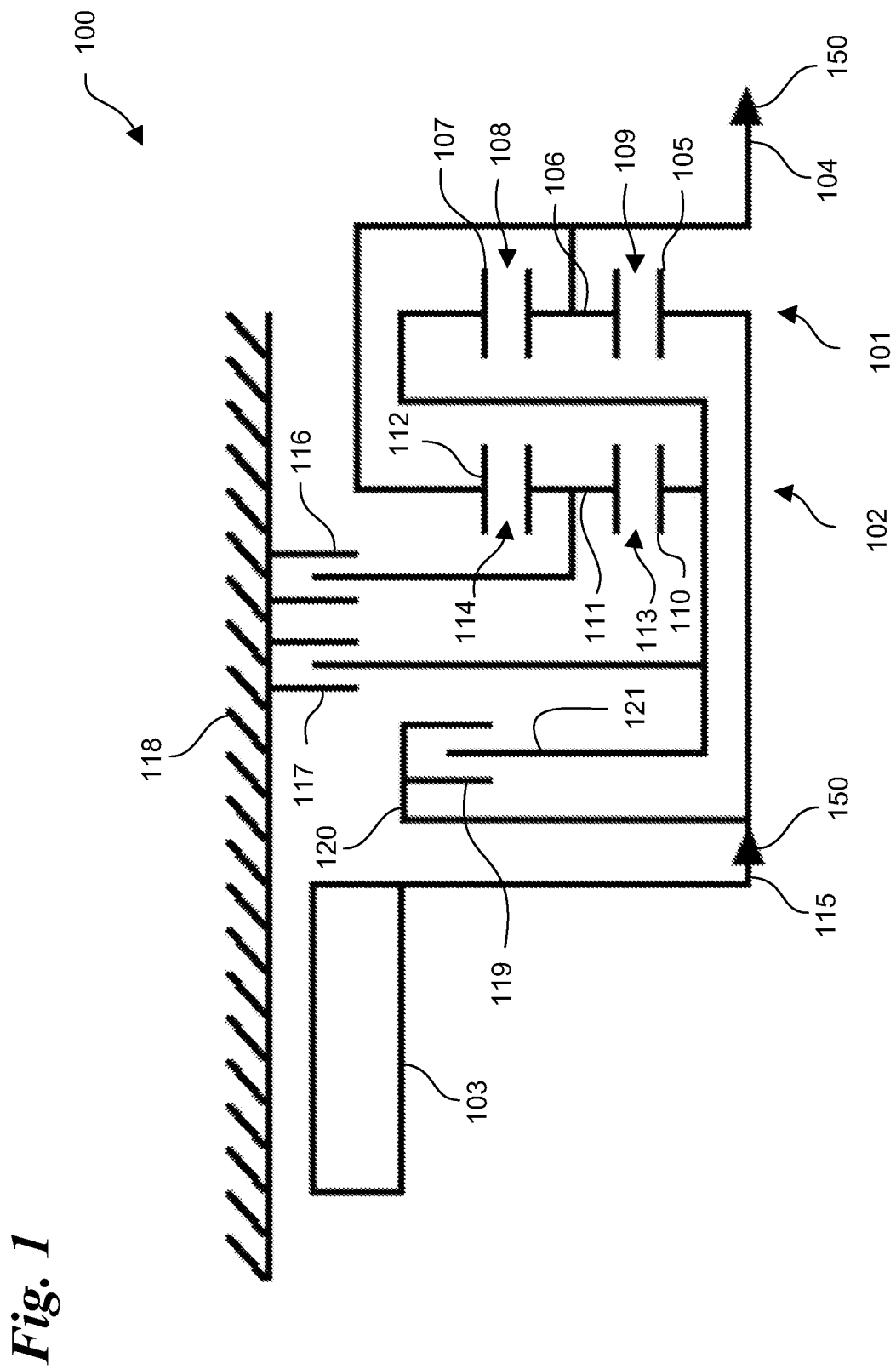
FIG. 1 is a diagram illustrating one example of the components and configuration of a drive system of the present disclosure.

Illustrated in FIG. 1 at 100 is one example of a drive system or drivetrain of the present disclosure. In this example, the motor is upstream of the transmission, or put differently, the transmission is downstream from the motor. A first planetary gearset 101 and a second planetary gearset 102 are optionally included and coupled to the drivetrain between an electric motor 103 and an output 104. In this example, planetary gearsets 101 and 102, and other transmission components are mounted downstream of the electric motor 103. Power flows from left to right in FIG. 1 according to arrows 150 with the electric motor 103 upstream of the gears and the output 104.

The gearset 101 optionally includes a sun gear 105, a carrier 106 to which is mounted one or more planetary gears that are arranged and configured to engage a ring gear 107 at 108, and the sun gear 105 at 109. The gearset 102 optionally includes a sun gear 110, a carrier 111 with one or more planetary gears mounted to it, and a ring gear 112. The planetary gears are arranged and configured to engage the ring gear 112 at 114, and the sun gear 110 at 113.

In another aspect, the carrier 106 of the first planetary gearset 101 is optionally coupled to the ring gear 112 of the second planetary gearset 102. In another aspect, the ring gear 107 of the first planetary gearset 101 is optionally coupled to the sun gear 110 of the second planetary gearset 102.

An input shaft 115 is coupled to the motor 103 and the sun gear 105 of the first planetary gearset 101. A first brake 116 is optionally included and is operable to selectively couple the carrier 111 of the second planetary gearset 102 to a mechanical ground 118. A second brake 117 is optionally included and may be operable to selectively couple the ring gear 107 of the first planetary gearset 101 and the sun gear 110 of the second planetary gearset 102 to ground 118.

In another aspect, a clutch 119 is optionally included and may be operable to selectively couple the input shaft 115 to the first gearset 101, and the second gearset 102. In one aspect, actuating the clutch 119 may engage the clutch to provide gear ratios such as a 1:1 gear ratio between the input shaft 115 and the output shaft 104. For example, the clutch 119 may be operable to selectively couple the input shaft 115 to the sun gear 110 of the second planetary gearset 102. In another aspect, a drive system of the present disclosure is optionally arranged and configured such that the input shaft 115 and the sun gear 105 of the first planetary gearset 101 are coupled to an input side 120 of the clutch 119, and the sun gear 110 of the second planetary gearset 102 is coupled to an output side 121 of the clutch 119.

In another aspect, the drivetrain of the present disclosure is optionally configured to be operated such that first brake, the second brake, and the clutch may be individually actuated to provide three forward, and three reverse gears. A neutral gear may be provided by disengaging all of the brakes and clutches at the same time. A reverse gear may be provided by reversing the torque provided by the input shaft. This may be achieved by, for example, reversing the direction of the electric motor. A wide range of gear ratios are available according to the power output available from the electric motor and the sizes of the gears in planetary gear sets.

For example, the drive system of the present disclosure is optionally configured so that first brake 116, the second brake 117, and the clutch 119 are each engaged separately at different times to provide three separate speed ratios of the input shaft 115 relative to the output shaft 104. Three separate reverse gear ratios are also optionally available by reversing the rotation of the input shaft 115. The rotational direction of the input shaft 115 is optionally directly linked to the rotational direction of the output shaft 104 to facilitate the reverse drive capability by simply reversing the direction of the electric motor. In this way the drive system of the present disclosure is simplified to reduce or eliminate the need for a separate reversing mechanism.

In another aspect, the first brake 116, the second brake 117, and the clutch 119 are optionally individually engaged such that only one of the three is engaged at any time, and when in neutral, optionally none of them are engaged. For example, engaging the first brake 116 optionally provides a first gear ratio of the three separate speed ratios that is less than or equal to 3:1, greater than 3:1, greater than 5:1, greater than 6:1, greater than 7:1, or more. These gear ratios may be achieved in the forward or reverse direction, with the reverse direction achieved by rotating the input shaft in the opposite direction. In one more specific example, the first gear speed ratio is about 6.6:1. In another aspect, the first gear ratio may be achieved by engaging the first brake 116, and without engaging the second brake 117, or the clutch 119.

A second gear may be achieved by the drive system of the present disclosure by engaging the second brake 117. This may provide a second gear ratio of the three separate speed ratios that is less than or equal to 1.5:1, greater than 1.5:1, greater than 2:1, greater than 3.5:1, greater than 4:1, or more. Any suitable gear ratio may be used for second gear. The second gear ratio may be achieved in the forward or reverse direction by rotating the input shaft 115 in either the forward or reverse direction. In one more specific example, the second gear speed ratio is about 2.65:1. In another aspect, the second gear ratio may be achieved by engaging the second brake 117, and without engaging the first brake 116, or the clutch 119.

The drive system of the present disclosure may achieve a third gear ratio by engaging the clutch, and this may be executed while the first brake 116, and the second brake 117 are disengaged. Thus a 1:1 gear ratio may be obtained. Other gears may be included as well in the drive system rendering a third gear ratio of the three separate speed ratios that may be less than or equal to 0.5:1, greater than 0.5:1, greater than 1:1, greater than 1.5:1, or more. Any suitable gear ratio may be used for third gear. Third gear ratios may be achieved in either a forward or a reverse driving mode by rotating the input shaft 115 in either the forward or reverse direction while the clutch 119 is engaged. In one more specific example, the third gear speed ratio is about 1:1 thus providing a direct drive from the electric motor 103 to the output shaft 104. In another aspect, the third gear ratio may be achieved by engaging the clutch 119 while disengaging the first and second brakes 116 and 117 respectively.

In another aspect, the first brake 116, the second brake 117, the clutch 119 may be optionally implemented with one or more frictional elements selectively placed in contact with one another. First brake 116 and second brake 117 may include a friction braking system with one or more rotatable braking components interspersed between one or more stationary braking components. By selectively applying a compression force to the braking components, the rotating components may be pressed against the stationary components until the rotation is brought to a complete stop thus "grounding" the rotating portion of the braking assembly to the stationary components while the compression force is maintained.

The clutch 119 may include multiple sets of frictional elements that are rotatable and are interspersed between each other. One set may be coupled to the input side 120 where power is received from motor 103, while the other set of frictional elements may be coupled to the output side 121 of the clutch from which downstream components receive torque from the input side. By selectively applying a compression force to the multiple sets of frictional components, the input side 120 and the output side 121 may be held stationary with respect to each other while the compression force is maintained. This allows torque applied to the input side 120 (such as from the motor 103) to be selectively transmitted to the output side 121 and anything coupled to it when the clutch 119 is engaged.

In another aspect, first brake 116, second brake 117, or clutch 119 may include one or more dog clutches having rotating components that engage by interference or clearance fit thus reducing or eliminating the opportunity for slip that may be inherent in a friction clutch or brake. A dog clutch configuration may be useable either in place of the frictional components described above, or along with them. In another aspect, first brake 116, and second brake 117, or clutch 119 optionally includes a Selectable One Way Clutch (SOWC).

Figure 2:
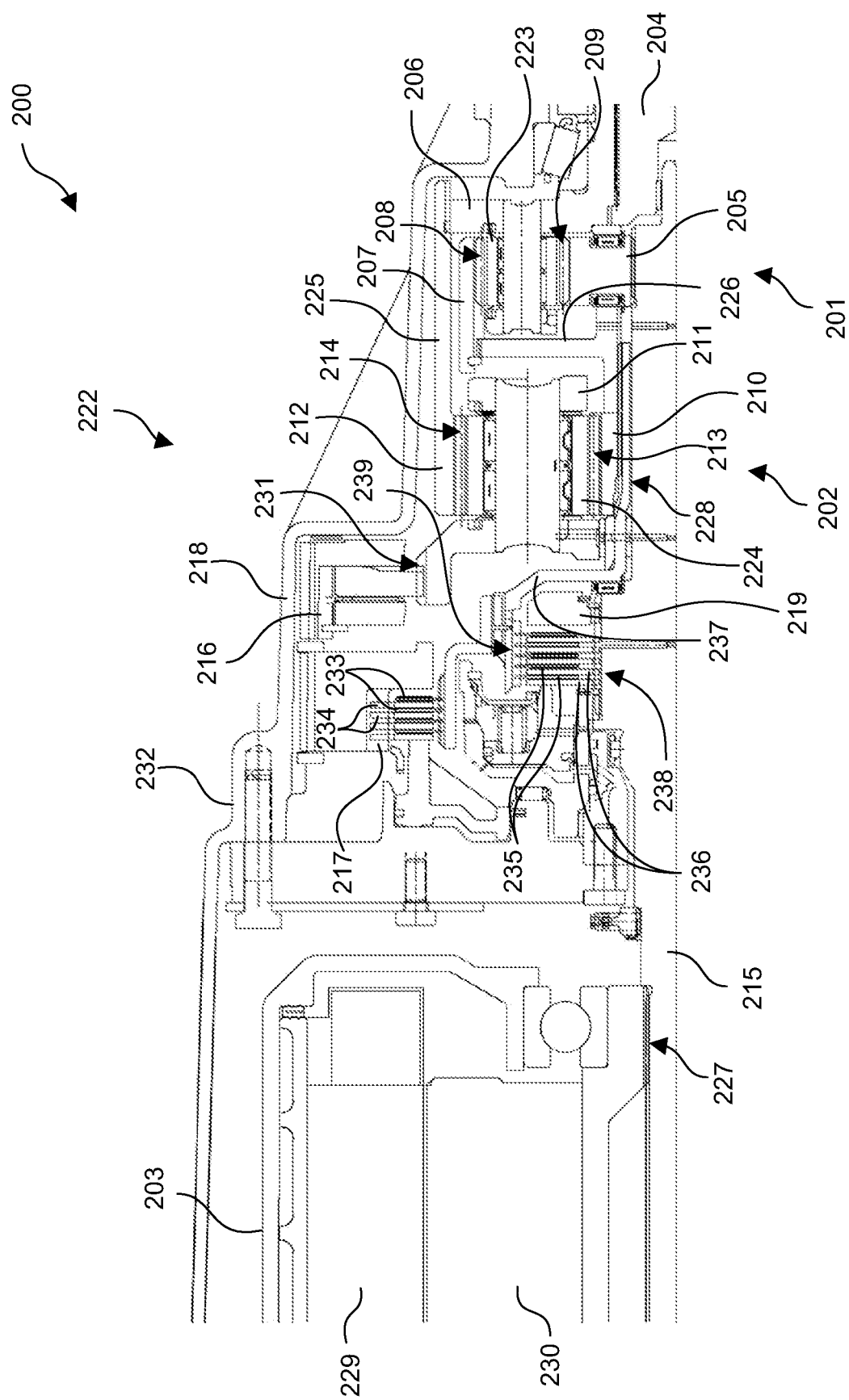
FIG. 2 is a cut away view illustrating another example of the arrangement of components of a drive system of the present disclosure.

Illustrated in FIG. 2 at 200 is another example of a drive system or drivetrain of the present disclosure that is similar in some respect to the example shown in FIG. 1. In this example, a first planetary gearset 201 and a second planetary gearset 202 are optionally included and coupled to the drivetrain between an electric motor 203 and an output shaft 204. The electric motor 203 optionally includes a stator 229, and a rotor 230. In this example, planetary gearsets 201 and 202, and other transmission components in a transmission 222 are mounted downstream of the electric motor 203. Power flows from left to right in FIG. 2 with the electric motor 203 upstream of the transmission 222 and the output shaft 204.

The gearset 201 optionally includes a sun gear 205, a carrier 206 to which is mounted one or more planetary gears 223 that are arranged and configured to engage a ring gear 207 at 208, and the sun gear 205 at 209. The gearset 202 optionally includes a sun gear 210, a carrier 211 with one or more planetary gears 224 mounted to it, and a ring gear 212. The planetary gears 224 are arranged and configured to engage the ring gear 212 at 214, and the sun gear 210 at 213.

In this example, the carrier 206 of the first planetary gearset 201 is coupled to the ring gear 212 of the second planetary gearset 202 by an intermediate linkage 225. In another aspect, the ring gear 207 of the first planetary gearset 201 is coupled to the sun gear 210 of the second planetary gearset 202 by an intermediate linkage 226.

An input shaft 215 is coupled to the rotor 230 of motor 203 at 227, and to the sun gear 205 of the first planetary gearset 201 at 228. A first brake 216 is optionally included and may be coupled to the carrier 211 at 231. The first brake 216 is thus operable to selectively couple the carrier 211 of the second planetary gearset 202 to a mechanical ground 218, here implemented as the housing 232 of transmission 222. Housing 232 at least partially surrounds the first and second planetary gearsets 201 and 202, and thus the housing 232 is operable as a ground or reference point for controlling the motion of the gears, shafts, and other rotating components of the transmission 222 and/or the overall drivetrain 200.

A second brake 217 is optionally included and may be operable to selectively couple the ring gear 207 of the first planetary gearset 201 and the sun gear 210 of the second planetary gearset 202 to ground 218. In this example, the second brake 217 includes a friction braking system with one or more rotatable braking components 233 interspersed between one or more stationary braking components 234. The rotating components 233 are coupled to sun gear 210 of the second planetary gearset 202 by an intermediate linkage 237, and to the ring gear 207 of the first planetary gearset 201 by intermediate linkages 237 and 226. By selectively applying a compression force to the stationary components 234 and the rotating components 233 the rotation of components 233 are selectively brought to a complete stop thus "grounding" the rotating components 233 to ground 218. In this way, the sun gear 210 of the second planetary gearset 202, and the ring gear 207 of the first planetary gearset 201 may be selectively stopped from rotating.

In another aspect, a clutch 219 is included and optionally implements a friction system with one or more rotatable components 235 interspersed between one or more separately rotatable components 236. Components 236 are coupled to the input shaft 215 at 238, while components 236 are coupled to intermediate linkages 237 at 239. Power arrives at clutch 219 from the input shaft 215 thus making 238 the input side of clutch 219, and 239 the output side. The rotating components 235 are coupled to the sun gear 210 of the second planetary gearset 202 by the intermediate linkage 237, and to the ring gear 207 of the first planetary gearset 201 by intermediate linkages 237 and 226 together. By selectively applying a compression force to the rotating components 235 and 236, the input side and the output side of clutch 219 begin rotating together thus coupling the rotation of the input shaft 215 to the sun gear 210 and ring gear 207.

In another aspect, the first brake 216, the second brake 217, and the clutch 219 are each separately engageable at different times to provide at least three separate speed ratios at the output shaft 204 relative to the input shaft 215. Three separate reverse gear ratios are also provided for by reversing the rotation of the electric motor 203. The rotational direction of the input shaft 215 is here directly linked to the rotational direction of the output shaft 204 via the gearsets 201 and 202 to facilitate a reverse driving capability.

As discussed herein throughout, the drivetrain examples of the present disclosure are optionally configured to be operated such that a first brake, a second brake, and a clutch may be individually actuated to provide three forward, and three reverse gears. A wide range of gear ratios are available according to the power output available from the electric motor and the arrangement of the gears in the disclosed arrangement of planetary gear sets.

For example, the gear ratios may be obtained according to Table 1 below:

TABLE 1

| Range | Ratio | Clutch | Brake 2 | Brake 1 |
|---|---|---|---|---|
| 1st | 6.654:1 | | | X |
| 2nd | 2.656:1 | | X | |
| 3rd | 1:1 | X | | |
| Neutral | N/A | | | |

Considering Table 1, engaging the first brake optionally provides a first gear ratio of about 6.654:1. Engaging the second brake optionally provides a second gear ratio of about 2.656:1. Engaging the clutch optionally provides a third gear ratio of about 1:1. These gear ratios may be achieved in the forward or reverse direction, with the reverse direction achieved by rotating the input shaft in the opposite direction. Other gear ratios may be obtained by using different configurations of ring gear, sun gear, and planetary gears in the first and second planetary gearsets the present disclosure.

Figure 3:
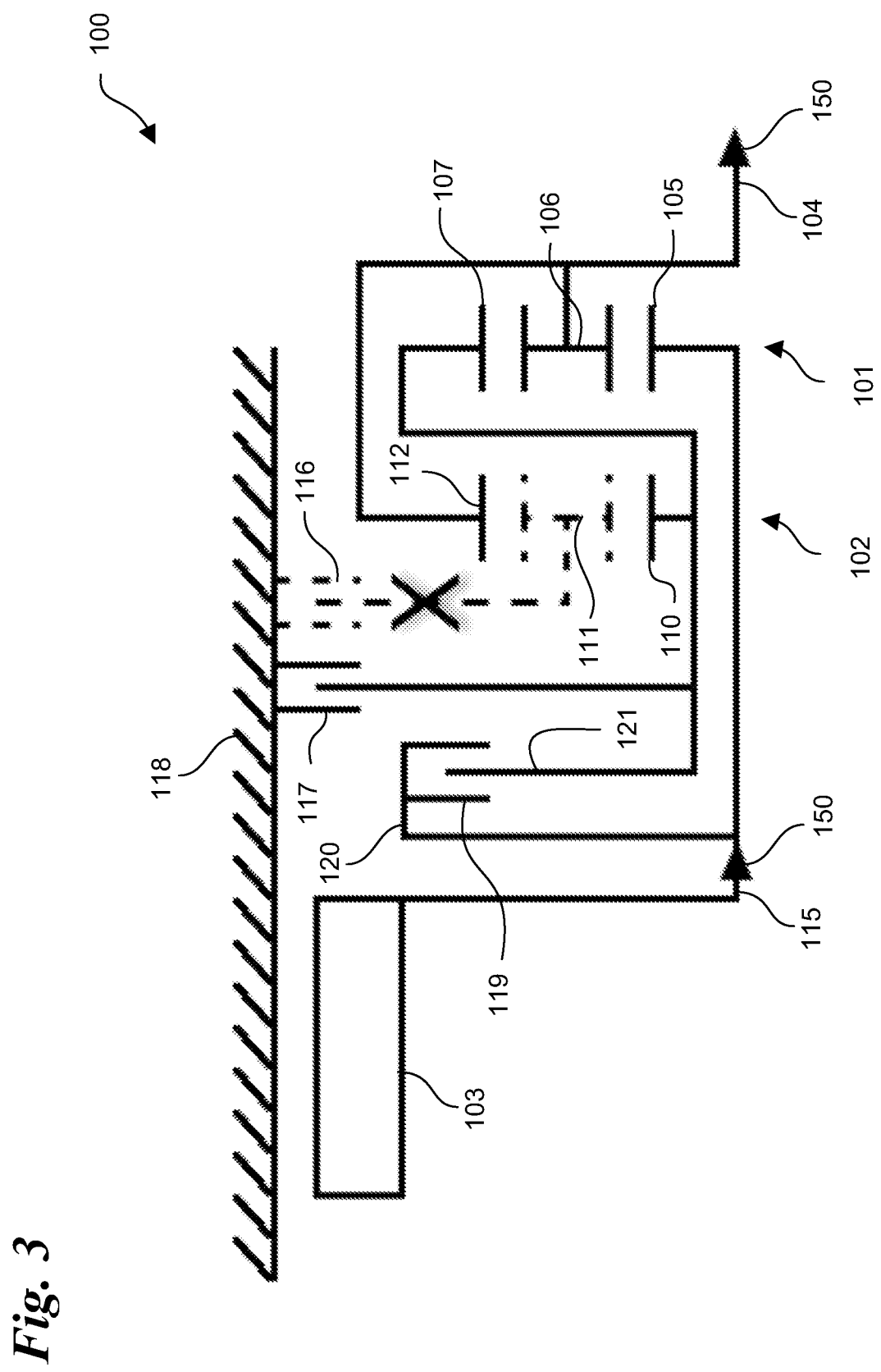
FIG. 3 is a diagram illustrating the example of FIG. 1 in operation.
Figure 4:
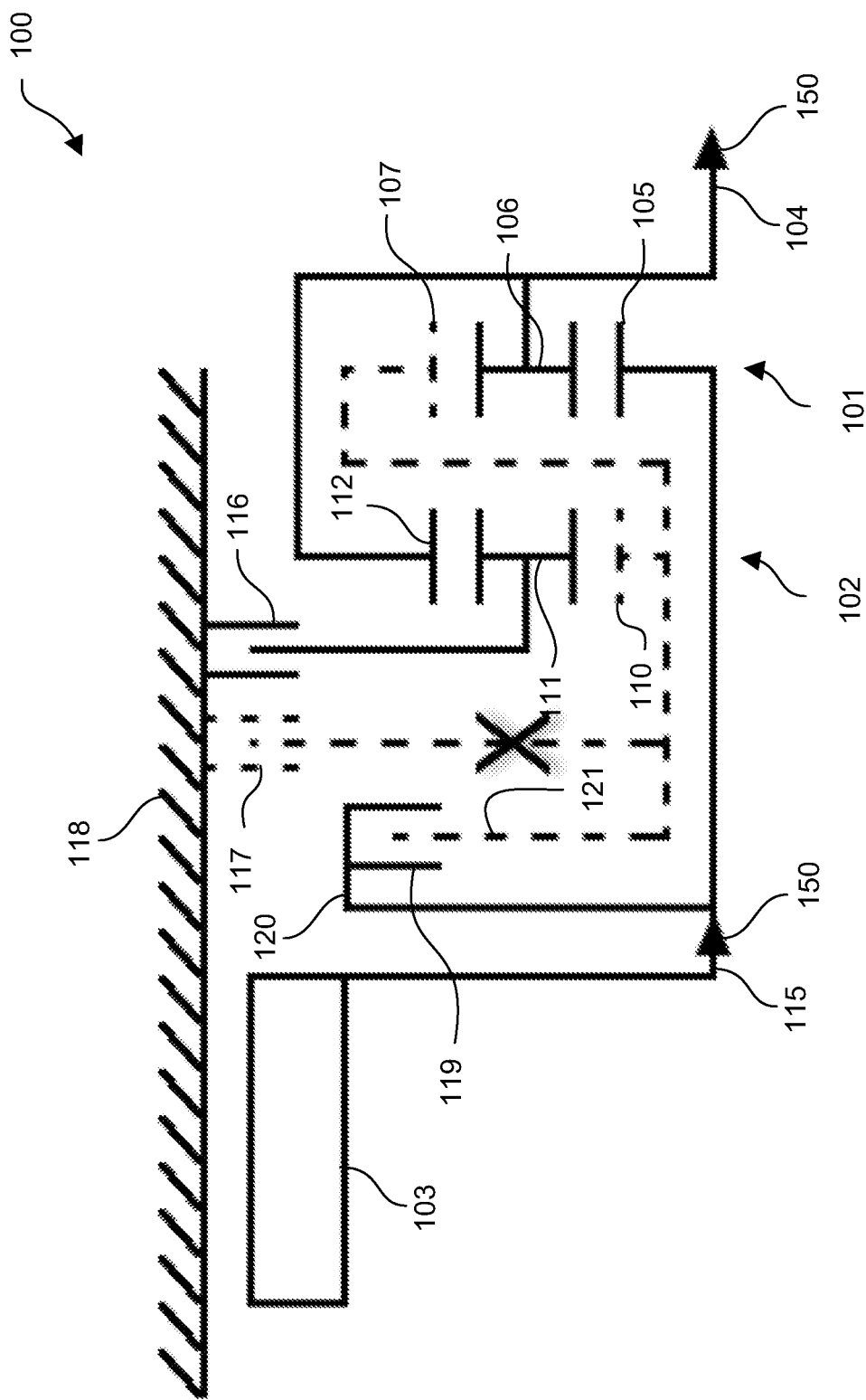
FIG. 4 is another diagram illustrating the example of FIG. 1 in operation.
Figure 5:
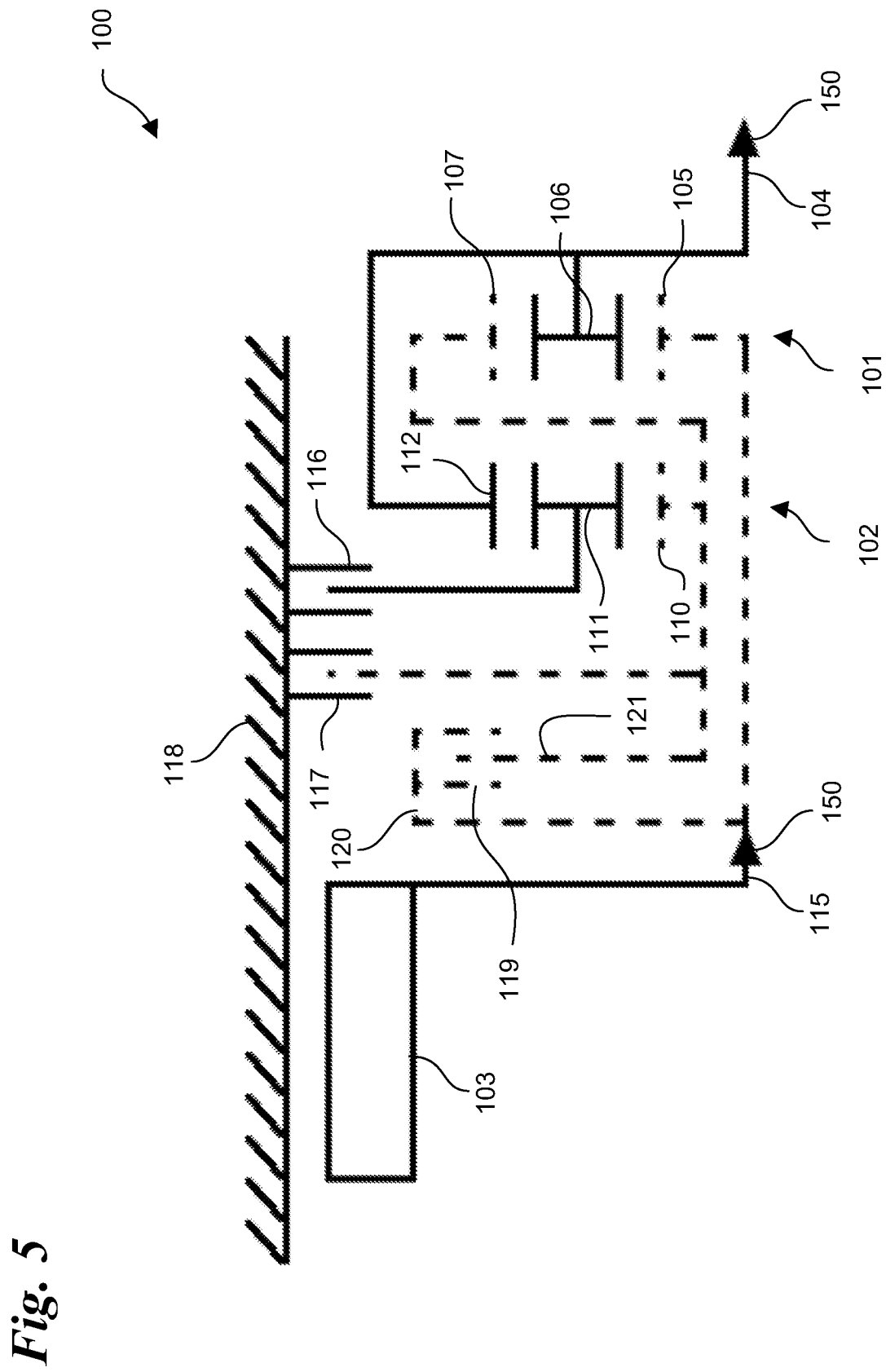
FIG. 5 is another diagram illustrating the example of FIG. 1 in operation.

Examples of the concepts disclosed in FIGS. 1 and 2 are shown in operation in FIGS. 3-5. Reference is made to specific aspects of FIGS. 1 and 2, but the general concepts are applicable to either example where in both cases, the gears and clutching mechanisms (referred to in FIG. 2 as transmission 222) are shown downstream from the electric motor. Reference is made here to the part names used throughout the present disclosure, corresponding examples of which are shown in both FIGS. 1 and 2 and elsewhere.

In FIG. 3, the first brake is actuated without the second brake or the clutch which couples the carrier of the second planetary gearset to ground. This means that the carrier of the second gearset is maintained in place and is not allowed to rotate with respect to a predetermined mechanical ground (signified here by dashed lines with an "X"). The sun gear, ring gear, and planetary gears of the first planetary are allowed to rotate with the sun gear and ring gear of the second planetary gearsets according to their respective configurations. In this way power can transfer from the electric motor, downstream through the transmission, to the output to provide a first gear ratio.

In FIG. 4, the second brake is actuated without the first brake or the clutch which grounds the sun gear of the second planetary gearset, and the ring gear of the first planetary gearset. This means that these parts of the transmission are held in place and are not allowed to rotate (signified here by dashed lines with an "X"). The carrier, ring gear, and planetary gears of the second planetary gearset are thus allowed to rotate with the carrier, planetary gears, and the sun gear of the first planetary gearset according to their respective configurations. This allows torque to transfer to the output shaft according to a second gear ratio.

In FIG. 5, the clutch is actuated without the first or the second brake. This causes the sun gear of the second planetary gearset, and the ring gear of the first planetary gearset to be locked in rotation with the input shaft. These parts of the transmission are thus coupled together (signified by the dashed lines) and rotate as one. The carrier, ring gear, and planetary gears of both the first and the second planetary gearsets are thus allowed to rotate according to their respective configurations. This allows torque to transfer to the output shaft according to a third gear ratio.

Figure 6:
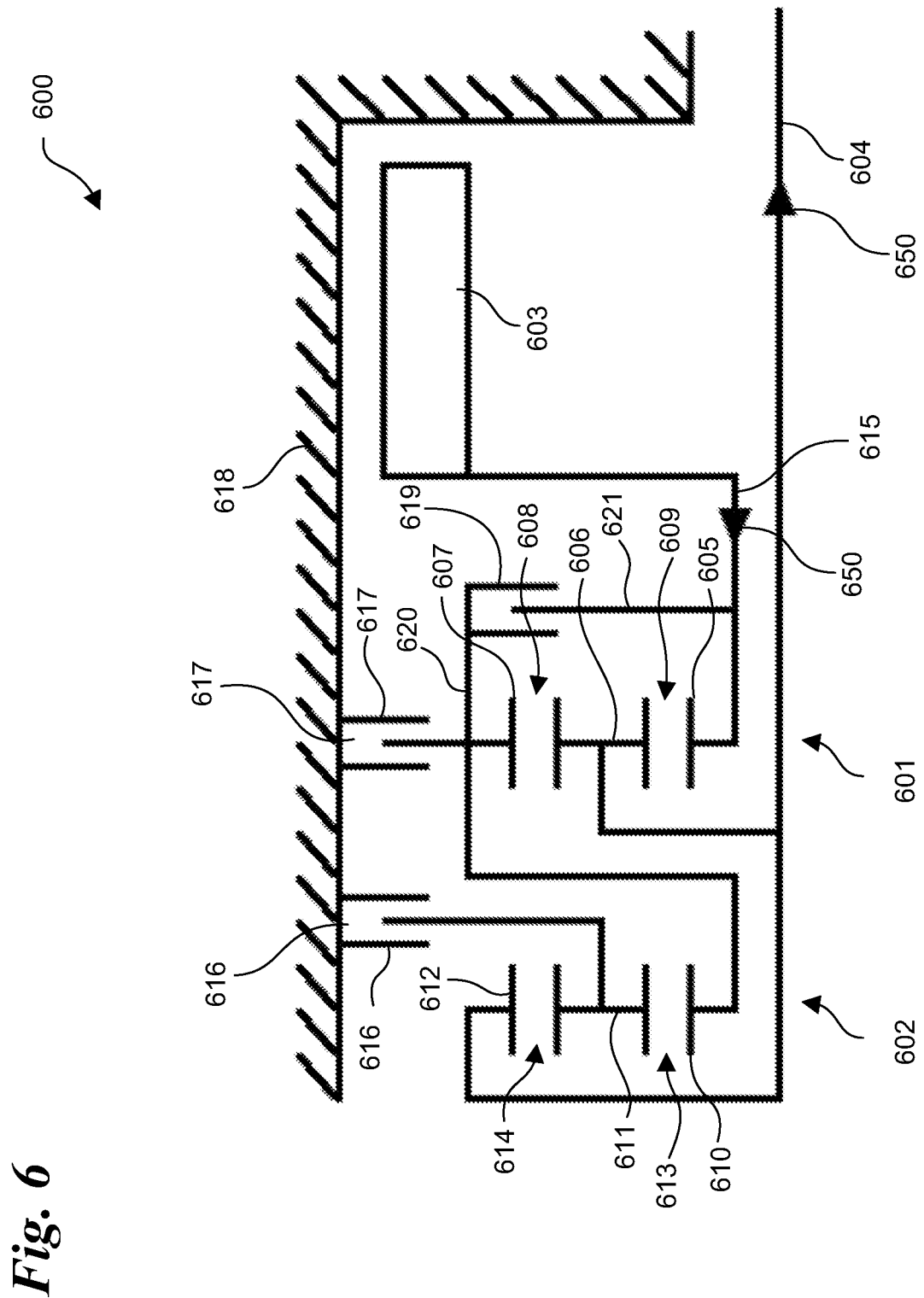
FIG. 6 is a diagram illustrating another example of the components and configuration of a drive system of the present disclosure.

Illustrated in FIG. 6 at 600 is another different example of a drive system or drivetrain of the present disclosure where the motor is downstream of the transmission, or put differently, the transmission is upstream of the motor. In this example, a first planetary gearset 601 and a second planetary gearset 602 are optionally included and coupled to the drivetrain such that power first flows upstream away from the motor 603 and away from the output 604 according to arrows 650 before reversing direction to flow back by the motor 603 to the output 604. In this example, planetary gearsets 601 and 602, and other transmission components are mounted upstream of the electric motor 603. Power first flows right to left in FIG. 6 before reversing direction to exit right at output 604 as illustrated by arrows 650.

The gearset 601 optionally includes a sun gear 605, a carrier 606 to which is mounted one or more planetary gears that are arranged and configured to engage a ring gear 607 at 608, and the sun gear 605 at 609. The gearset 602 optionally includes a sun gear 610, a carrier 611 with one or more planetary gears mounted to it, and a ring gear 612. The planetary gears are optionally arranged and configured to engage the ring gear 612 at 614, and the sun gear 610 at 613.

In another aspect, the carrier 606 of the first planetary gearset 601 is optionally coupled to the ring gear 612 of the second planetary gearset 602. In another aspect, the ring gear 607 of the first planetary gearset 601 is optionally coupled to the sun gear 610 of the second planetary gearset 602.

An input shaft 615 is coupled to the motor 603 and the sun gear 605 of the first planetary gearset 601. A first brake 616 is optionally included and is operable to selectively couple the carrier 611 of the second planetary gearset 602 to a mechanical ground 618. Mechanical ground may be any suitable structure for holding one or more mechanisms of the disclosed drive system stationary in position relative to the ground structure. A second brake 617 is optionally included and may be operable to selectively couple the ring gear 607 of the first planetary gearset 601 and the sun gear 610 of the second planetary gearset 602 to ground 618.

In another aspect, a clutch 619 is optionally include and may be operable to selectively couple the input shaft 615 to the first gearset 601, and the second gearset 602. In one aspect, actuating the clutch 619 may engage the clutch to provide gear ratios such as a 1:1 gear ratio between the input shaft 615 and the output shaft 604. For example, the clutch 619 may be operable to selectively couple the input shaft 615 to the sun gear 610 of the second planetary gearset 602. In another aspect, a drive system of the present disclosure is optionally arranged and configured such that the input shaft 615 and the sun gear 605 of the first planetary gearset 601 are coupled to an input side 620 of the clutch 619, and the sun gear 610 of the second planetary gearset 602 is optionally coupled to an output side 621 of the clutch 619.

As with other drive systems disclosed herein, the drive system in FIG. 6 is optionally configured to be operated such that first brake, the second brake, and the clutch may be individually actuated to provide three forward, and three reverse gears. A neutral gear may be provided by disengaging all of the brakes and clutches at the same time. A wide range of gear ratios are available according to the power output available from the electric motor and the relative sizes of the gears in planetary gear sets.

For example, the drive system of the present disclosure is optionally configured so that first brake 616, the second brake 617, and the clutch 619 are each engaged separately at different times to provide three separate speed ratios of the input shaft 615 relative to the output shaft 604. Three separate reverse gear ratios are optionally available by reversing the rotation of the input shaft 615. The rotational direction of the input shaft 615 is optionally directly linked to the rotational direction of the output shaft 604 to facilitate the reverse drive capability. In this way the drive system of the present disclosure is simplified to reduce or eliminate the need for a separate reversing mechanism.

In another aspect, the first brake 616, the second brake 617, and the clutch 619 are optionally individually engaged such that only one of the three is engaged at any time, and when in neutral, none of them are engaged. For example, engaging the first brake 616 optionally provides a first gear ratio of the three separate forward and reverse speed ratios (input shaft 615 to output shaft 604) that is less than or equal to 3:1, greater than 3:1, greater than 5:1, greater than 6:1, greater than 7:1, or more. In one more specific example, the first gear speed ratio is about 6.6:1. In another aspect, the first gear ratio may be achieved by engaging the first brake 616, and without engaging the second brake 617, or the clutch 619.

A second gear may be achieved by the drive system of the present disclosure by engaging the second brake 617. This may provide a second gear ratio of the three separate forward and reverse speed ratios that is less than or equal to 1.5:1, greater than 1.5:1, greater than 2:1, greater than 3.5:1, greater than 4:1, or more. Any suitable gear ratio may be used for second gear. In one more specific example, the second gear speed ratio is about 2.65:1. In another aspect, the second gear ratio may be achieved by engaging the second brake 617, and without engaging the first brake 616, or the clutch 619.

The drive system of the present disclosure may achieve a third gear ratio by engaging the clutch, and this may be executed while the first brake 616, and the second brake 617 are disengaged. Thus a 1:1 gear ratio may be obtained. Other gears may be included as well in the drive system rendering a third gear ratio gear ratio of the three separate forward and reverse speed ratios that may be less than or equal to 0.5:1, greater than 0.5:1, greater than 1:1, greater than 1.5:1, or more. Any suitable gear ratio may be used for third gear. In one more specific example, the third gear speed ratio is about 1:1 thus providing a direct drive from the electric motor 603 to the output shaft 604. In another aspect, the third gear ratio may be achieved by engaging the clutch 619 while disengaging the first and second brakes 616 and 617 respectively.

In another aspect, the first brake 616, the second brake 617, the clutch 619 may be optionally implemented with one or more frictional elements selectively placed in contact with one another. First brake 616 and second brake 617 may include a friction braking system with one or more rotatable braking components interspersed between one or more stationary braking components. By selectively applying a compression force to the braking components, the rotating components may be pressed against the stationary components until the rotation is brought to a complete stop thus "grounding" the rotating portion of the braking assembly to the stationary components while the compression force is maintained.

The clutch 619 may include multiple sets of frictional elements that are rotatable and are interspersed between each other. One set may be coupled to the input side 620 where power is received from motor 603, while the other set of frictional elements may be coupled to the output side 621 of the clutch from which downstream components receive torque from the input side. By selectively applying a compression force to the multiple sets of frictional components, the input side 620 and the output side 621 may be held stationary with respect to each other while the compression force is maintained. This allows torque applied to the input side 620 (such as from the motor 603) to be selectively transmitted to the output side 621 and anything coupled to it when the clutch 619 is engaged.

In another aspect, first brake 616, second brake 617, or clutch 619 may include one or more dog clutches having rotating components that engage by interference or clearance fit thus reducing or eliminating the opportunity for slip. A dog clutch configuration may be useable either in place of the frictional components described above, or along with them.

Figure 7:
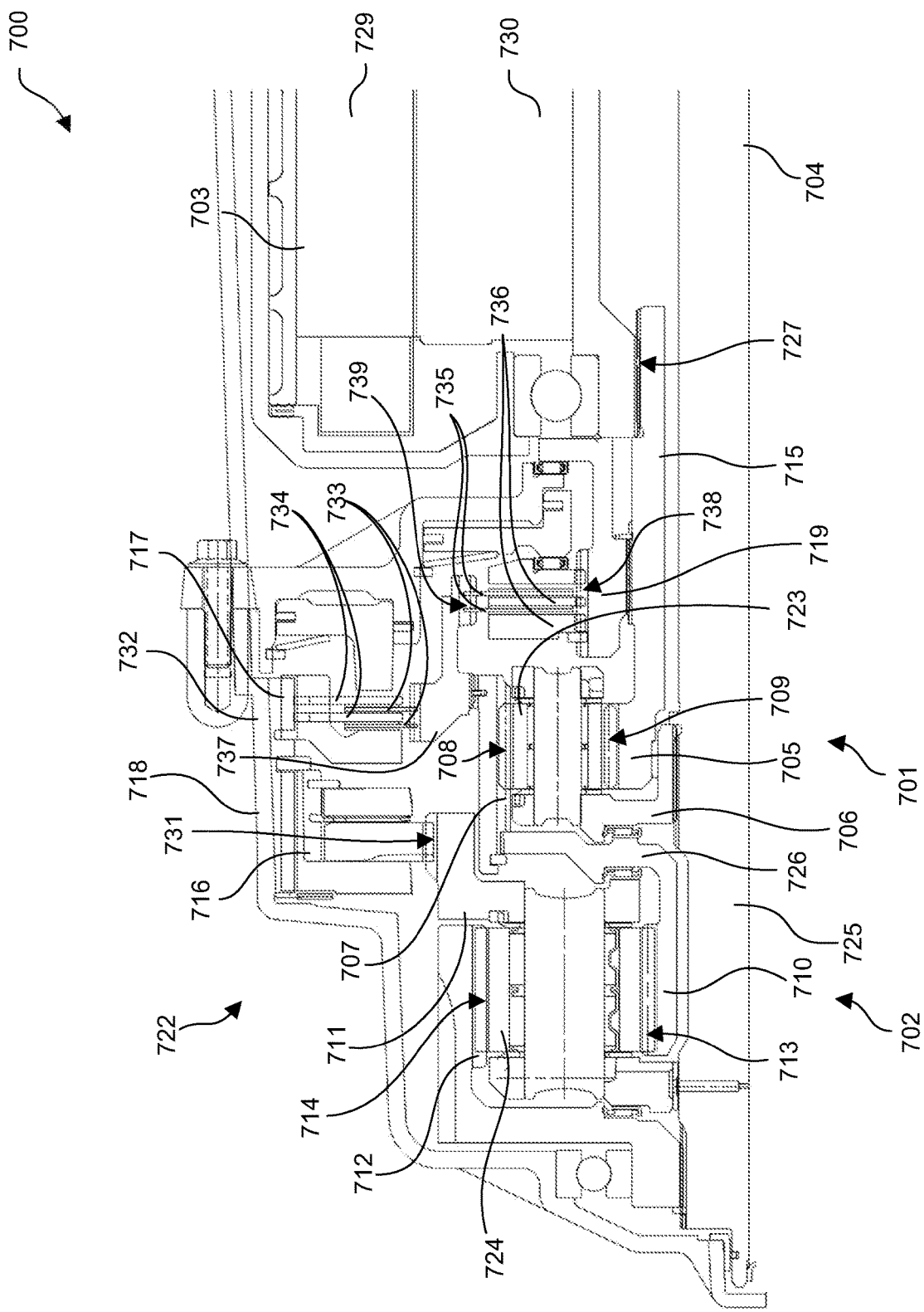
FIG. 7 is a cut away view illustrating another example of the arrangement of components of a drive system of the present disclosure.

Illustrated in FIG. 7 at 700 is another example of a drive system or drivetrain of the present disclosure that is similar in some respects to the example shown in FIG. 6. In this example, a first planetary gearset 701 and a second planetary gearset 702 are optionally included and coupled to the drivetrain upstream from an electric motor 703 and an output shaft 704. The electric motor 703 includes a stator 729, and a rotor 730. In this example, planetary gearsets 701 and 702, and other transmission components in a transmission 722 are mounted upstream of the electric motor 703. Power initially flows from right to left in FIG. 7 before reversing direction to flow downstream via output shaft 704.

The gearset 701 optionally includes a sun gear 705, a carrier 706 to which provides a mount for one or more planetary gears 723 that are arranged and configured to engage a ring gear 707 at 708, and the sun gear 705 at 709. The gearset 702 optionally includes a sun gear 710, a carrier 711 with one or more planetary gears 724 mounted to it, and a ring gear 712. The planetary gears 724 are arranged and configured to engage the ring gear 712 at 714, and the sun gear 710 at 713.

In this example, the carrier 706 of the first planetary gearset 701 is coupled to the ring gear 712 of the second planetary gearset 702 by an intermediate linkage 725, which in this example is implemented by output shaft 704. In another aspect, the ring gear 707 of the first planetary gearset 701 is coupled to the sun gear 710 of the second planetary gearset 702 by an intermediate linkage 726.

An input shaft 715 is coupled to the rotor 730 of motor 703 at 727, and to the sun gear 705 of the first planetary gearset 701. A first brake 716 is included and is coupled to the carrier 711 at 731. The first brake 716 is thus operable to selectively couple the carrier 711 of the second planetary gearset 702 to a mechanical ground 718, here implemented as the housing 732 of transmission 722. Housing 732 at least partially surrounds the first and second planetary gearsets 701 and 702, and thus the housing 732 is operable as a ground or reference point for controlling the motion of the gears, shafts, and other rotating components of the transmission 722 and/or the overall drivetrain 700.

A second brake 717 is optionally included and may be operable to selectively couple the ring gear 707 of the first planetary gearset 701 and the sun gear 710 of the second planetary gearset 702 to ground 718. In this example, the second brake 717 includes a friction braking system with one or more rotatable braking components 733 interspersed between one or more stationary braking components 734. The rotating components 733 are coupled to sun gear 710 of the second planetary gearset 702 by an intermediate linkage 737 coupled to ring gear 707 of the first planetary gearset 701, and by intermediate linkage 726. By selectively applying a compression force to the braking components, the rotating components 733 may be pressed against the stationary components 734 until the rotation of components 733 are brought to a complete stop thus grounding the rotating portion 733 to ground 718. In this way, the sun gear 710 of the second planetary gearset 702, and the ring gear 707 of the first planetary gearset 701 may together be selectively stopped from rotating.

In another aspect, a clutch 719 is included and optionally implements a frictional system with one or more rotatable components 735 interspersed between one or more separately rotatable components 736. Components 736 are coupled to the input shaft 715 at 738, while components 735 are coupled to intermediate linkages 737 at 739. Power arrives at clutch 719 from the input shaft 715 thus making 738 the input side of clutch 719, and 739 the output side. The rotating components 735 are coupled to the sun gear 710 of the second planetary gearset 702 by the intermediate linkage 737, and by intermediate linkage 726 via ring gear 707. By selectively applying a compression force to the rotating components 735 and 736, the rotating components are selectively pressed together until both the input and output sides of the clutch 719 rotate together thus coupling the input shaft 715 together with the sun gear 710 and ring gear 707.

As discussed herein throughout, the first brake 716, the second brake 717, and the clutch 719 are each separately engageable at different times to provide at least three separate speed ratios at the output shaft 704 relative to the input shaft 715. Three separate reverse gear ratios are also optionally provided for by reversing the rotation of the input shaft 715. The rotational direction of the input shaft 715 is thus directly related to the rotational direction of the output shaft 704 via the gearsets 701 and 702 to facilitate a reverse driving capability.

As discussed herein throughout, the drivetrain of the present disclosure is configured to be operated such that first brake, the second brake, and the clutch may be individually actuated to provide three forward, and three reverse gears. A wide range of gear ratios are available according to the power output available from the electric motor and the arrangement of the gears in planetary gear sets.

For example, the gear ratios may be obtained according to Table 1 above. Engaging the first brake 716 optionally provides a first gear ratio of 6.654:1. Engaging the second brake 717 optionally provides a second gear ratio of 2.656:1. Engaging the clutch 719 optionally provides a third gear ratio of 1:1. These gear ratios may be achieved in the forward or reverse direction, with the reverse direction achieved by rotating the input shaft 715 in the opposite direction. Other gear ratios may be obtained by using different configurations of ring gear, sun gear, and planetary gears in the first and second planetary gearsets 701 and 702.

Figure 8:
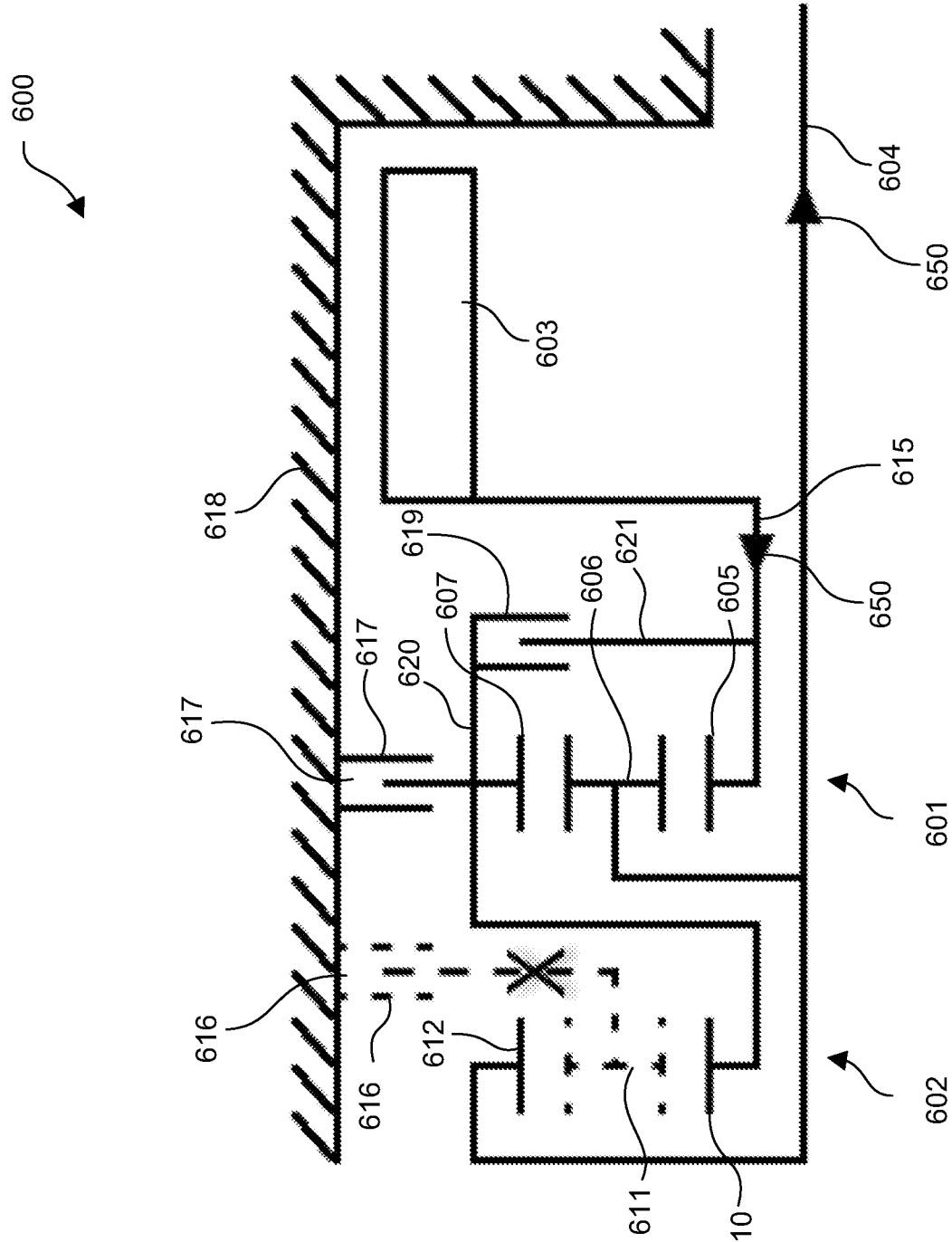
FIG. 8 is a diagram illustrating the example of FIG. 6 in operation.
Figure 9:
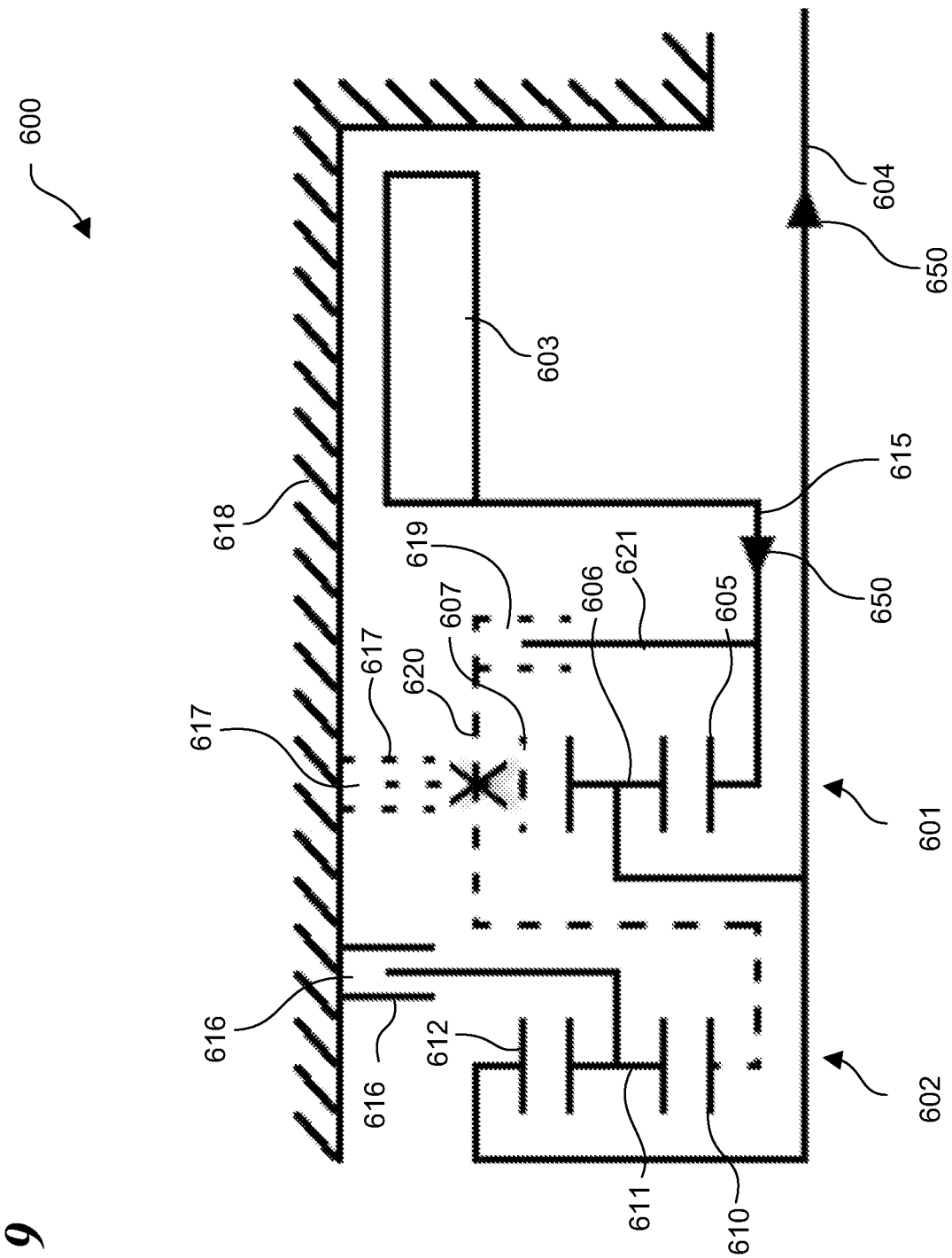
FIG. 9 is another diagram illustrating the example of FIG. 6 in operation.
Figure 10:
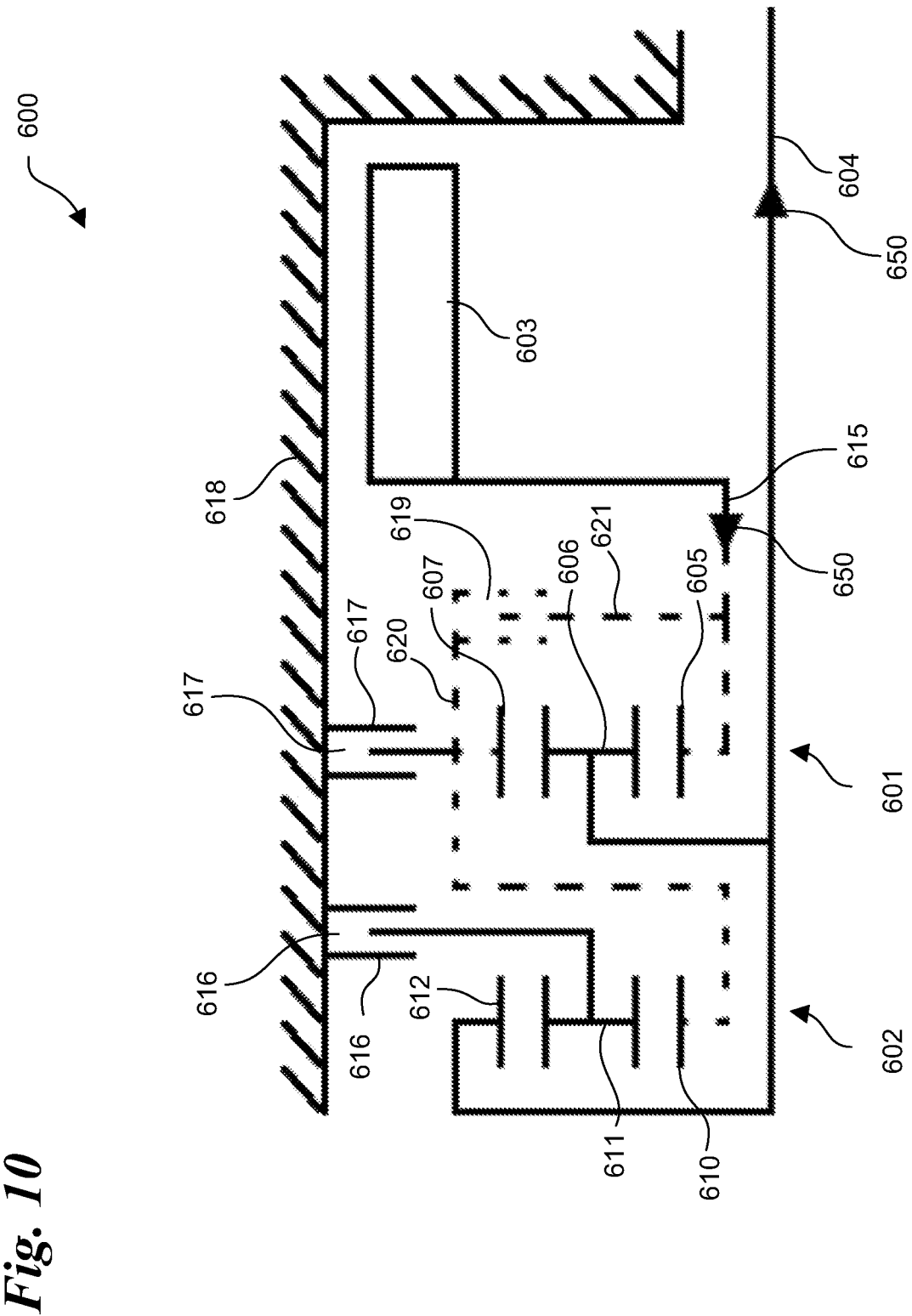
FIG. 10 is another diagram illustrating the example of FIG. 6 in operation.

Examples of the concepts disclosed in FIGS. 6 and 7 are shown in operation in FIGS. 8-10. Reference is made to specific aspects of FIGS. 6 and 7, but the general concepts are applicable to either example where in both cases, the gears and clutching mechanisms (referred to in FIG. 6 as transmission 722) are shown upstream from the electric motor. Reference is made here to part names used throughout the present disclosure, corresponding examples of which are shown in both FIGS. 6 and 7 and elsewhere.

In FIG. 8, the first brake is actuated without the second brake or the clutch which grounds the carrier of the second planetary gearset. This means that the carrier of the second gearset is maintained in place and is not allowed to rotate relative to the other parts in the transmission (signified here by dashed lines with an "X"). The sun gear, ring gear, and planetary gears of the first planetary are allowed to rotate with the sun gear and ring gear of the second planetary gearsets according to their respective configurations. In this way power can transfer from the electric motor, upstream to the transmission, then downstream to the output to provide a first gear ratio.

In FIG. 9, the second brake is actuated without the second brake or the clutch which grounds the sun gear of the second planetary gearset, and the ring gear of the first planetary gearset. This means that these parts of the transmission are held in place and are not allowed to rotate (signified here by dashed lines with an "X"). The carrier, ring gear, and planetary gears of the second planetary gearset are thus allowed to rotate with the carrier, planetary gears, and the sun gear of the first planetary gearset according to their respective configurations. This allows torque to transfer to the output shaft according to a second gear ratio.

In FIG. 10, the clutch is actuated without the first or the second brake. This causes the sun gear of the second planetary gearset, and the ring gear of the first planetary gearset to be locked in rotation with the input shaft. These parts of the transmission are thus coupled together (signified by the dashed lines) and rotate together as one. The carrier, ring gear, and planetary gears of both the first and the second planetary gearsets are thus allowed to rotate according to their respective configurations. This provides for a torque transfer to the output shaft according to the a third gear ratio.

Figure 11:
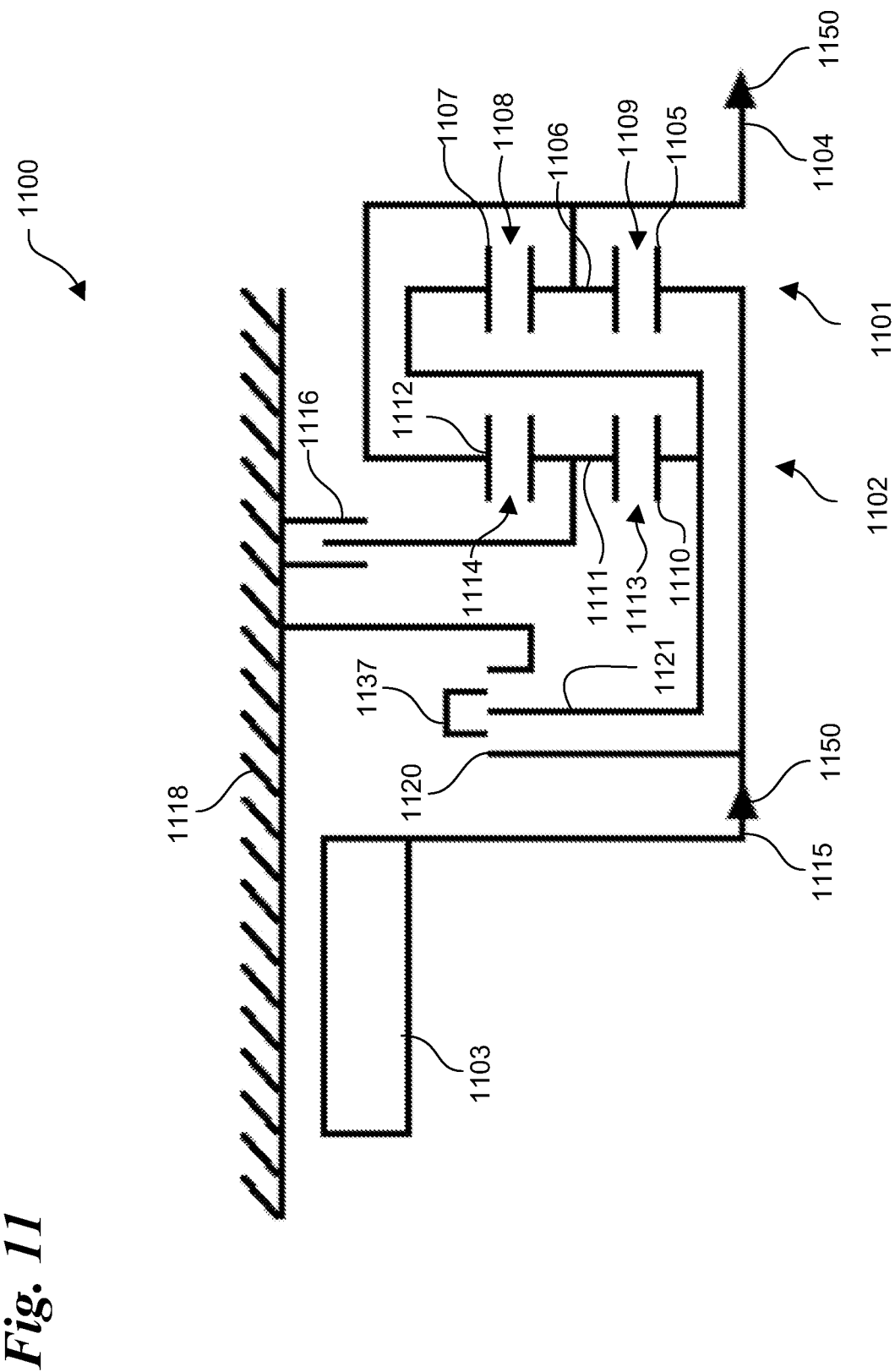
FIG. 11 is a diagram illustrating another example of the components and configuration of a drive system of the present disclosure.

Illustrated in FIG. 11 at 1100 is a different example of a drive system or drivetrain of the present disclosure where the motor is upstream of the transmission, and a synchronizer is used in place of a clutch and a brake. As illustrated throughout, the motor may be positioned either upstream or downstream without limitation. As illustrated at 1100, a first planetary gearset 1101 and a second planetary gearset 1102 are optionally included and coupled to the drivetrain between an electric motor 1103 and an output 1104. In this example, planetary gearsets 1101 and 1102, and other transmission components are mounted downstream of the electric motor 1103. Power flows from left to right in FIG. 11 according to the arrows 1150 with the electric motor 1103 upstream of the gears and the output 1104.

The gearset 1101 optionally includes a sun gear 1105, a carrier 1106 to which is mounted one or more planetary gears that are arranged and configured to engage a ring gear 1107 at 1108, and the sun gear 1105 at 1109. The gearset 1102 optionally includes a sun gear 1110, a carrier 1111 with one or more planetary gears mounted to it, and a ring gear 1112. The planetary gears are arranged and configured to engage the ring gear 1112 at 1114, and the sun gear 1110 at 1113.

In another aspect, the carrier 1106 of the first planetary gearset 1101 is optionally coupled to the ring gear 1112 of the second planetary gearset 1102. In another aspect, the ring gear 1107 of the first planetary gearset 1101 is optionally coupled to the sun gear 1110 of the second planetary gearset 1102.

An input shaft 1115 is coupled to the motor 1103 and the sun gear 1105 of the first planetary gearset 1101. A first brake 1116 is optionally included and is operable to selectively couple the carrier 1111 of the second planetary gearset 1102 to a mechanical ground 1118. Mechanical ground may be any suitable structure for holding one or more mechanisms of the disclosed drive system stationary in position relative to the ground structure.

A synchronizer 1137 is optionally included and may be configured to select between multiple modes of operation. In one aspect, synchronizer 1137 is operable in a brake mode to selectively couple the ring gear 1107 of the first planetary gearset 1101 and the sun gear 1110 of the second planetary gearset 1102 to ground 1118. In this respect, synchronizer 1137 is optionally operable as a brake to selectively hold a portion of the mechanism at 1100 from rotating relative to ground. In another aspect, synchronizer 1137 may be operable in a drive mode to selectively couple the input shaft 1115 to the first gearset 1101, and the second gearset 1102. In this respect, synchronizer 1137 is optionally operable as a clutch to selectively hold separate rotating portions of the mechanism at 1100 from rotating relative to each other. Synchronizer 1137 may also be actuated to a neutral mode by disengaging the synchronizer 1137 so that neither the input 1120, the output 1121, nor the ground 1118 are coupled together by the synchronizer 1137 (as shown in FIG. 1100).

In another aspect, synchronizer 1137 may be said to include a second brake and a clutch which are optionally coupled to opposite sides of the synchronizer. Shifting a selector of the synchronizer may alternately engage a second brake portion of the synchronizer 1137 by moving to the brake mode, while shifting the selector of the synchronizer 1137 in the opposite direction may engage the clutch portion of the synchronizer 1137 by moving to the drive mode. Thus any of the disclosed examples having a first and second brake and a clutch may be implemented with a single brake and a synchronizer configured to operate as either a clutch or a brake as disclosed herein.

Actuating the synchronizer 1137 in the drive mode optionally provides gear ratios such as a 1:1 gear ratio between the input shaft 1115 and the output shaft 1104. For example, the synchronizer 1137 in the drive mode may be operable to selectively couple the input shaft 1115 to the sun gear 1110 of the second planetary gearset 1102.

In another aspect, synchronizer 1137 is optionally arranged and configured such that the input shaft 1115 and the sun gear 1105 of the first planetary gearset 1101 are coupled to an input side 1120 of the synchronizer 1137, and the sun gear 1110 of the second planetary gearset 1102 is coupled to an output side 1121 of the synchronizer 1137.

In another aspect, the drivetrain of the present disclosure is optionally configured to be operated such that first brake and the synchronizer may be individually actuated to provide three forward, and three reverse gears. A neutral gear may be provided by disengaging the brake and the synchronizer at the same time. A wide range of gear ratios are available according to the power output available from the electric motor and the sizes of the gears in planetary gear sets.

For example, the drive system of the present disclosure is optionally configured so that first brake 1116 and the synchronizer 1137 are each engaged separately at different times to provide three separate speed ratios of the input shaft 1115 relative to the output shaft 1104. Three separate reverse gear ratios are optionally available by reversing the rotation of the input shaft 1115. The rotational direction of the input shaft 1115 is optionally directly linked to the rotational direction of the output shaft 1104 to facilitate this reverse drive capability without the need for a separate reversing mechanism.

In another aspect, the first brake 1116, and the synchronizer 1137 are optionally individually engaged such that the brake 1116, or any one mode of synchronizer 1137 is engaged at any one time. When in neutral, 1116 is not engaged, and 1137 is in the neutral position. For example, engaging the first brake 1116 optionally provides a first gear ratio of the three separate forward and reverse speed ratios that is less than or equal to 3:1, greater than 3:1, greater than 5:1, greater than 6:1, greater than 7:1 or more. In one more specific example, the first gear speed ratio is about 6.6:1. In another aspect, the first gear ratio may be achieved by engaging the first brake 1116 while the synchronizer 1137 remains in the neutral mode.

A second gear may be achieved by the drive system of the present disclosure by engaging the synchronizer in the brake mode. This may provide a second forward and reverse gear ratio of the three separate speed ratios that is less than or equal to 1.5:1, greater than 1.5:1, greater than 2:1, greater than 3.5:1, greater than 4:1, or more. Any suitable gear ratio may be used for second gear. In one more specific example, the second gear speed ratio is about 2.65:1. In another aspect, the second gear ratio may be achieved by engaging the synchronizer 1137 in the brake mode without engaging the first brake 1116.

The drive system of the present disclosure may achieve a third gear ratio by engaging the synchronizer 1137 in the drive mode, and this may be executed while the first brake 1116 is disengaged. Thus a 1:1 gear ratio may be obtained. Other gears may be included as well in the drive system rendering a third gear ratio gear ratio of the three separate forward and reverse speed ratios that may be less than or equal to 0.5:1, greater than 0.5:1, greater than 1:1, greater than 1.5:1, or more. Any suitable gear ratio may be used for third gear. In one more specific example, the third gear speed ratio is about 1:1 thus providing a direct drive from the electric motor 1103 to the output shaft 1104. In another aspect, the third gear ratio may be achieved by engaging the synchronizer 1137 in the drive mode while disengaging the first brake 1116.

In another aspect, the first brake 1116 and the synchronizer 1137 may be optionally implemented with one or more frictional elements selectively placed in contact with one another. First brake 1116 may include a friction braking system with one or more rotatable braking components interspersed between one or more stationary braking components. By selectively applying a compression force to the braking components, the rotating components may be pressed against the stationary components until the rotation is brought to a complete stop. This grounds the rotating portion of the braking assembly to the stationary components while the compression force is maintained.

First synchronizer 1137 may include multiple frictional elements that are rotatable separately or together as needed. One set may be coupled to the input side 1120 where power is received from motor 1103, while the other set of frictional elements may be coupled to the output side 1121 of the clutch from which downstream components receive torque from the input side. By selectively applying a compression force to the components, the input side 1120 and the output side 1121 may be held stationary with respect to each other, or the output side 1121 and the ground 1118 may be held together, depending on the present mode of operation of the synchronizer 1137. The synchronizer 1137 allows torque applied to the input side 1120 (such as from the motor 1103) to be selectively transmitted to the output side 1121 when the synchronizer 1137 is engaged in the drive mode, or it allows the synchronizer 1137 to hold portions of the drive system motionless with respect to ground when engaged in the brake mode.

In another aspect, first brake 1116 or synchronizer 1137 may include one or more dog clutches having rotating components that engage by interference or clearance fit thus reducing or eliminating the opportunity for slip. A dog clutch configuration may be useable either in place of the frictional components described above, or along with them.

Figure 12:
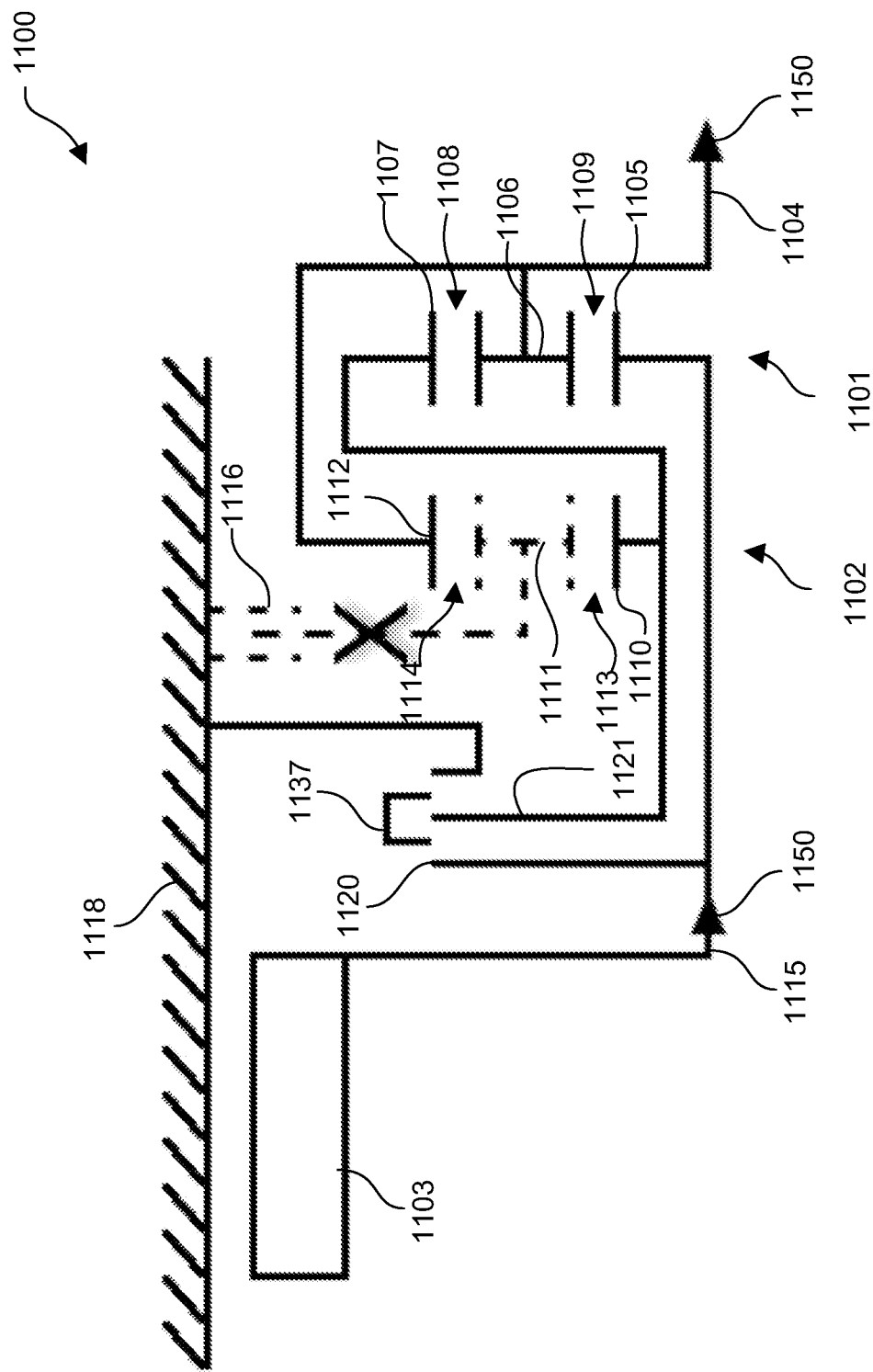
FIG. 12 is a diagram illustrating the example of FIG. 11 in operation.
Figure 13:
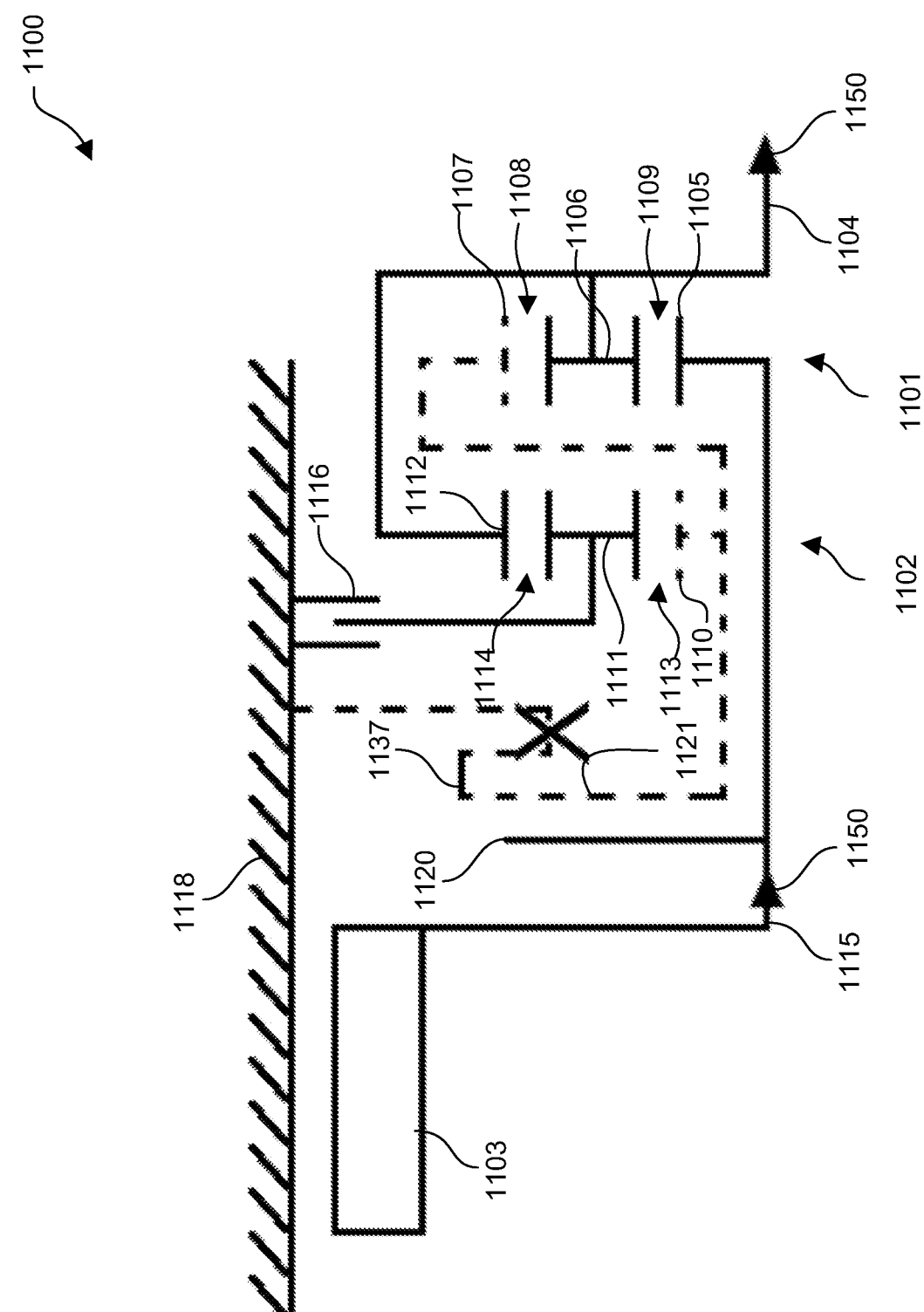
FIG. 13 is another diagram illustrating the example of FIG. 11 in operation.
Figure 14:
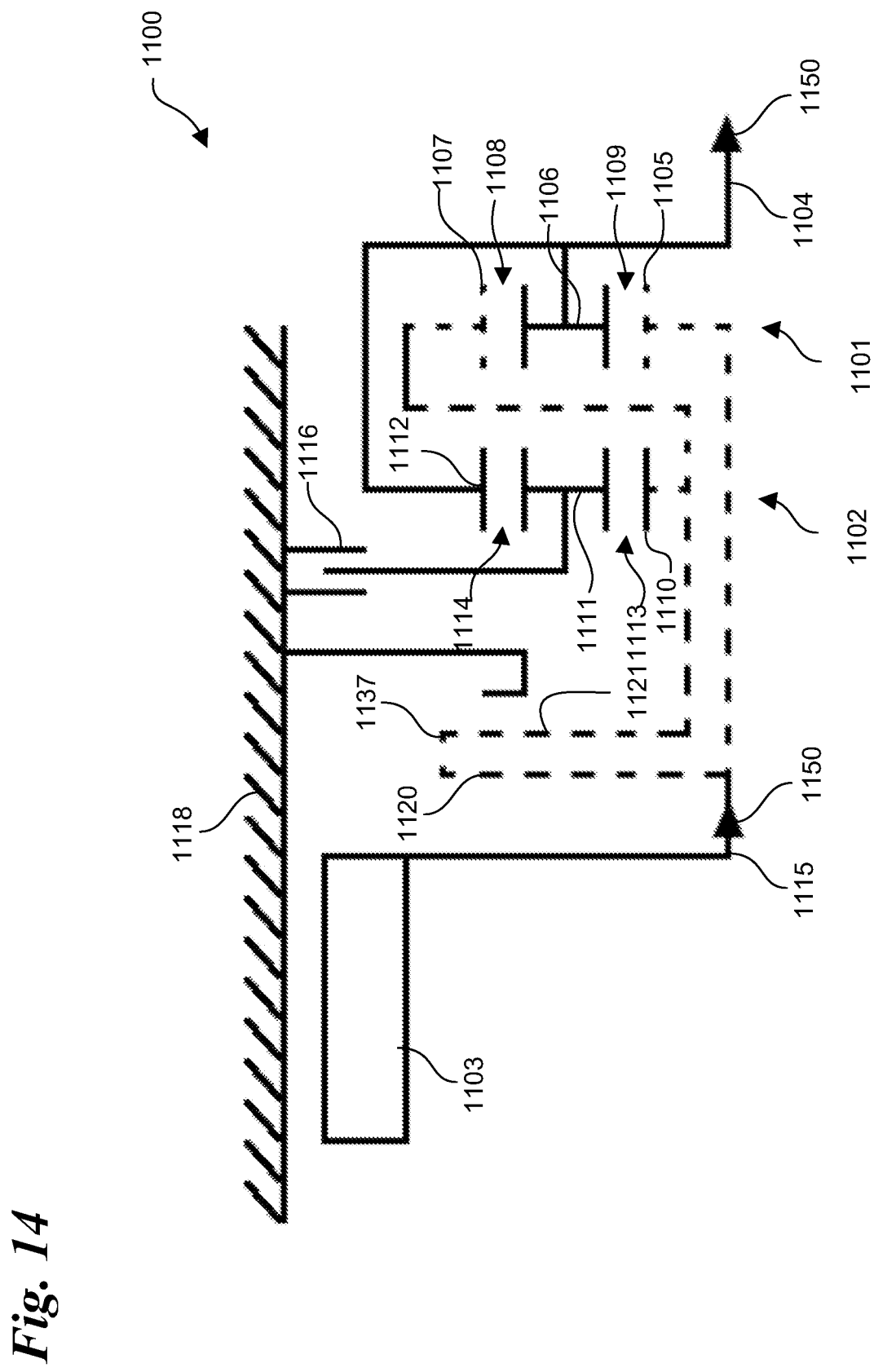
FIG. 14 is another diagram illustrating the example of FIG. 11 in operation.

Examples of the concepts disclosed in FIG. 11 are shown in operation in FIGS. 12-14. Reference is made to specific aspects of FIG. 11, but the general concepts are applicable to any of the disclosed examples to illustrate that a synchronizer may be used in place of a second brake and clutch in any of the disclosed examples. Reference is made here to the part names and corresponding examples discussed throughout the present disclosure with a specific configuration illustrated according to FIG. 11.

In FIG. 12, the first brake is actuated while the synchronizer is in the neutral mode which grounds the carrier of the second planetary. This means that the carrier of the second gearset is maintained in place and is not allowed to rotate relative to the other parts in the transmission (signified here by dashed lines with an "X"). The sun gear, ring gear, and planetary gears of the first planetary are allowed to rotate with the sun gear and ring gear of the second planetary gearsets according to their respective configurations. In this way power can transfer from the electric motor to the output to provide a first gear ratio.

In FIG. 13, the synchronizer is actuated in a brake mode while the first brake is disengaged, which grounds the sun gear of the second planetary gearset, and the ring gear of the first planetary gearset. This means that these parts of the transmission are held in place and are not allowed to rotate (signified here by dashed lines with an "X"). The carrier, ring gear, and planetary gears of the second planetary gearset are thus allowed to rotate with the carrier, planetary gears, and the sun gear of the first planetary gearset according to their respective configurations. This allows torque to transfer to the output shaft according to the second gear ratio.

In FIG. 14, the synchronizer is engaged in the drive mode while the first brake is disengaged. This causes the sun gear of the second planetary gearset, and the ring gear of the first planetary gearset to be locked in rotation with the input shaft. These parts of the transmission are thus coupled together (signified by the dashed lines) and rotate together as one. The carrier, ring gear, and planetary gears of both the first and the second planetary gearsets are thus allowed to rotate according to their respective configurations. This provides for a torque transfer to the output shaft according to the a third gear ratio.

Figure 15:
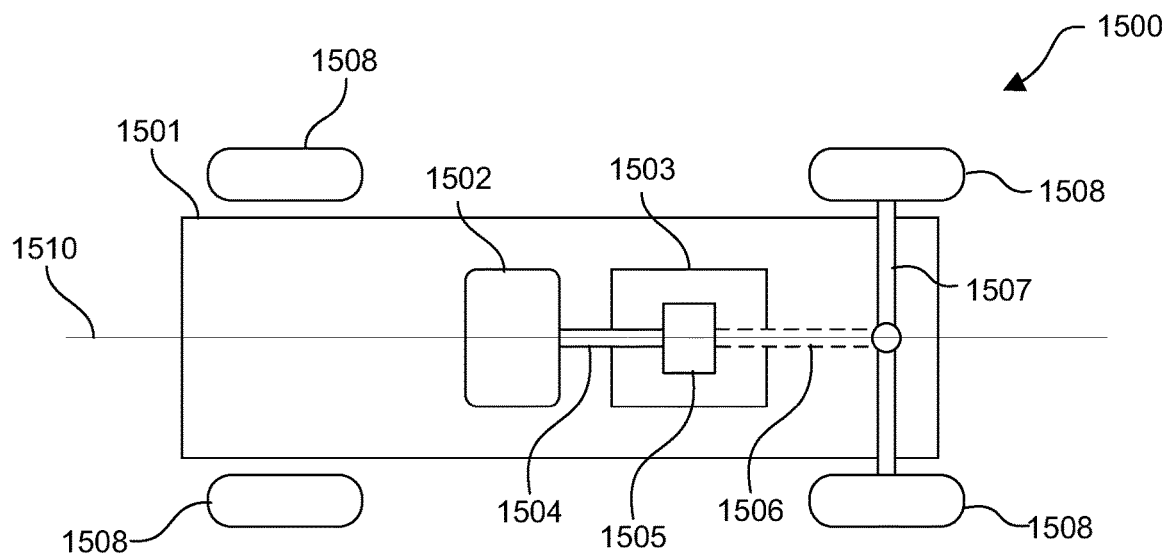
FIG. 15 is a diagram illustrating another example of the components and configuration of a drive system of the present disclosure.

FIGS. 15-24 illustrate several configurations for a drive system or drivetrain of the present disclosure mounted in a vehicle. These examples are meant to be illustrative rather than restrictive as any suitable configuration of the disclosed transmission and a drive system may be useful to provide three forward and three reverse gear ratios. In FIG. 15 at 1500, a vehicle 1501 is shown that optionally includes an electric motor 1502 which may be arranged and configured to provide torque to a transmission 1503 via an input shaft 1504. The three speed transmission may include an arrangement of one or more planetary gearsets 1505, and/or any suitable configuration of brakes, clutches, synchronizers, and the like as disclosed herein. The gearsets 1505 are optionally configured according to the present disclosure to provide three forward, and three reverse gear ratios. An output shaft 1506 of the transmission may be coupled to the gearsets 1505 according to the present disclosure to optionally provide power to a drive axle 1507. One or more ground engaging members 1508 may be included and may be coupled to the output shaft 1506. These ground engaging members may include, for example, tires, wheels, belts, tracks, and the like, or any combination thereof.

In another aspect, the drive system may be arranged and configured so that the motor 1502, the transmission 1503, and the output shaft 1506 are aligned axially on a common axis 1510. This common axis 1510 may optionally be substantially perpendicular to the drive axle 1507. In another aspect, the input shaft 1504 receiving power from the electric motor 1502 may extend outwardly toward the motor 1502 in a different direction from the output shaft 1506. The output shaft 1506 may extend outwardly away from the transmission 1503 and toward the drive axle 1507. In this configuration, the input shaft 1504 and the output shaft 1506 may extend out from the transmission 1503 in opposite directions.

In another aspect, the transmission 1503 and gearsets 1505 may be mounted downstream of the motor. Power optionally flows from the motor 1502 through the input shaft and into the transmission 1503 where it may then transfer through the gearsets 1505 and to the output shaft 1506. Power may then continue through the output shaft 1506 downstream to the drive axle 1507, and eventually to the ground engaging elements 1508.

Figure 16:
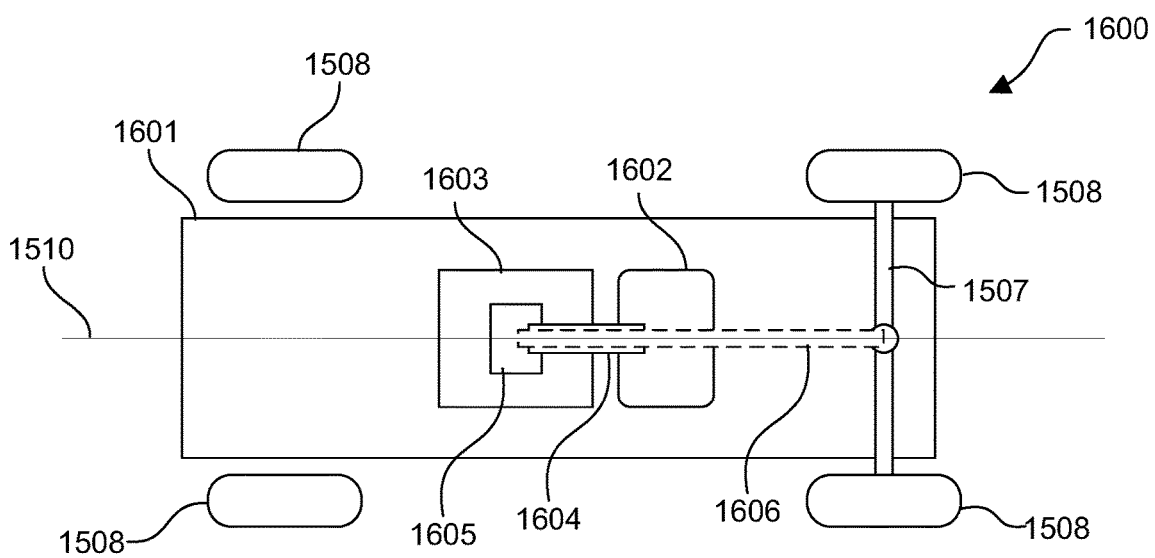
FIG. 16 is a diagram illustrating another example of the components and configuration of a drive system of the present disclosure.

FIG. 16 illustrates at 1600, another example of a vehicle 1601 that is like the vehicles of the preceding figures but with a different drive train arrangement. Vehicle 1601 optionally includes an electric motor 1602 which may be arranged and configured to provide torque to a transmission 1603 via an input shaft 1604. The three speed transmission may include an arrangement of one or more planetary gearsets 1605, and/or any suitable configuration of brakes, clutches, synchronizers, and the like as disclosed herein. The gearsets 1605 are optionally configured according to the present disclosure to provide three forward, and three reverse gear ratios. An output shaft 1606 of the transmission may be coupled to the gearsets 1605 according to the present disclosure to optionally provide power to a drive axle 1507. One or more ground engaging members 1508 may be included and may be coupled to the output shaft 1506.

In another aspect, the drive system may be arranged and configured so that the motor 1602, the transmission 1603, and the output shaft 1606 are aligned axially on a common axis 1610. This common axis 1610 may optionally be substantially perpendicular to the drive axle 1507. In another aspect, the input shaft 1604 receiving power from the electric motor may extend outwardly toward the motor 1602 in the same direction as the output shaft 1606 which may extend outwardly away from the transmission and toward the drive axle. In another aspect, the output shaft 1606 optionally passes through an opening defined by the input shaft 1604 and through an opening defined by the electric motor 1602 to engage with the drive axle 1507.

In another aspect, the transmission 1603 and gearsets 1605 may be mounted upstream of the motor 1602. Power optionally flows from the motor 1602 upstream through the input shaft and into the transmission 1603 where it may then transfer through the gearsets 1605 and to the output shaft

1606. Power may then flow downstream through the output shaft 1606 back through the motor 1602, and to drive axle 1507. The output shaft 1606 thus extends from the transmission 1603 to engage the drive axle 1507, and passes through a central cavity defined by the motor 1602.

Figure 17:
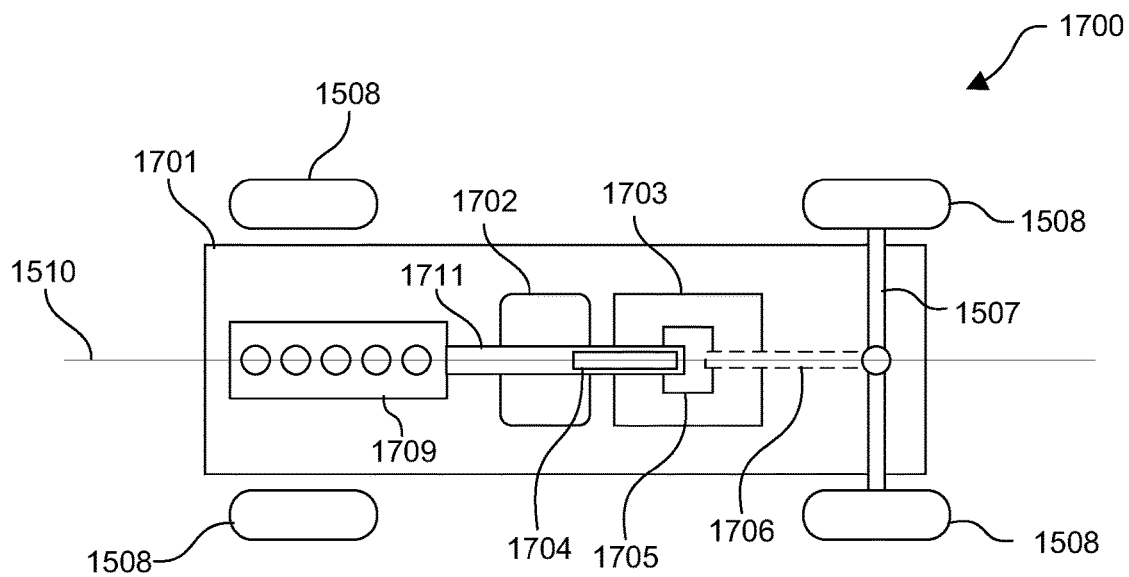
FIG. 17 is a diagram illustrating another example of the components and configuration of a drive system of the present disclosure.

In FIG. 17 at 1700, a vehicle 1701 is shown that is like is like the vehicles of the preceding figures. Vehicle 1701 optionally includes an electric motor 1702 which may be arranged and configured to provide torque to a transmission 1703 via an input shaft 1704. Vehicle 1701 also optionally includes an internal combustion engine 1709 which is arranged and configured to provide power to the transmission 1703 via a second input shaft 1711. In this configuration, motor 1702 and engine 1709 comprise a hybrid vehicle drive system that is operable to use a transmission 1703 of the present disclosure.

The three speed transmission may include an arrangement of one or more planetary gearsets 1705, and/or any suitable configuration of brakes, clutches, synchronizers, and the like. The gearsets 1705 are optionally configured according to the present disclosure to provide three forward, and three reverse gear ratios. An output shaft 1706 of the transmission may be coupled to the gearsets 1705 according to the present disclosure to optionally provide power to a drive axle 1507. The power delivered by the transmission 1703 may include power provided by the internal combustion engine 1709, the electric motor 1702, or any combination thereof. One or more ground engaging members 1508 may be included and may be coupled to the output shaft 1506.

In another aspect, the drive system may be arranged and configured so that motor 1702, the transmission 1703, and the output shaft 1706 are aligned axially on a common axis 1510. This common axis 1510 may optionally be substantially perpendicular to the drive axle 1507. In another aspect, at least a portion of the input shaft 1704 may be positioned within or adjacent to the input shaft 1711, and these two shafts may be aligned axially on the common axis 1510. In another aspect, the input shaft 1704 receiving power from the electric motor 1702, and/or the input shaft 1711 receiving power from the engine 1709, may extend outwardly from the transmission 1703 in a different direction from the output shaft 1706. The output shaft 1706 may, for example, extend outwardly away from the transmission and toward the drive axle 1507 from a side of transmission 1703 that is opposite shaft 1704 and 1711.

In another aspect, the transmission 1703 and gearsets 1705 may be mounted downstream of the motor 1702 and engine 1709. Power optionally flows from the motor 1702 through the input shaft 1704, and/or from engine 1709 through input shaft 1711, and into the transmission 1703 where it may then transfer through the gearsets 1705 and to the output shaft 1706. Power may then continue through the output shaft 1706 downstream to the drive axle 1507, and eventually to the ground engaging elements 1508.

Figure 18:
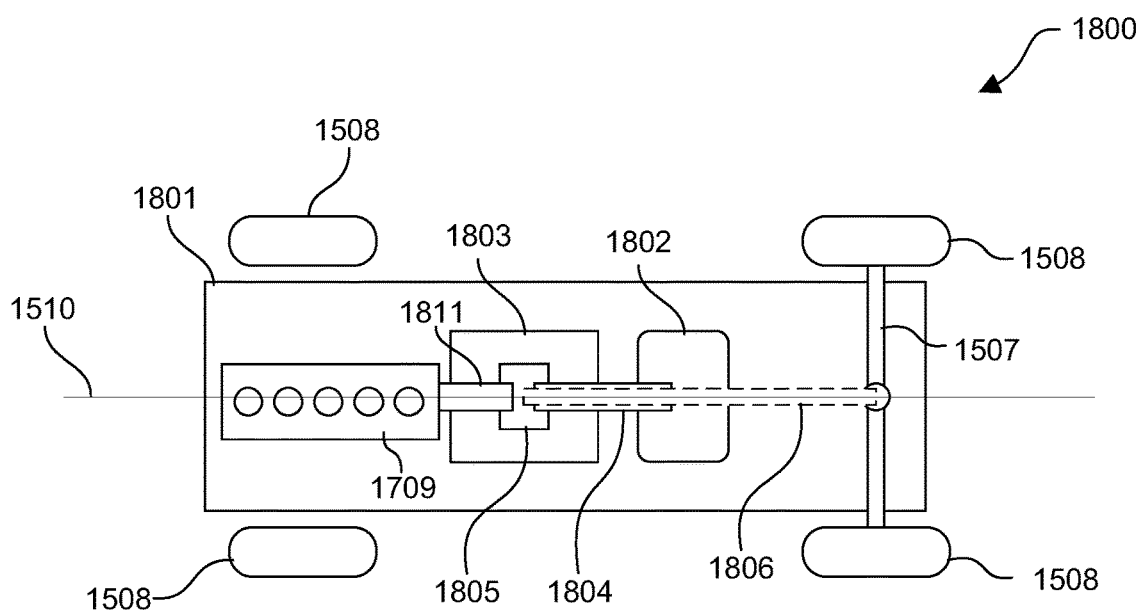
FIG. 18 is a diagram illustrating another example of the components and configuration of a drive system of the present disclosure.

In FIG. 18 at 1800, a vehicle 1801 is shown that is like the vehicle of the preceding figures. Vehicle 1801 optionally includes an electric motor 1802 which may be arranged and configured to provide torque to a transmission 1803 via an input shaft 1804. Vehicle 1801 also includes an internal combustion engine 1709 which is optionally arranged and configured to provide power to the transmission 1803 via a second input shaft 1811. In this configuration, motor 1802 and engine 1709 comprise a hybrid vehicle drive system that uses a transmission 1803 of the present disclosure.

The three speed transmission 1803 may include any suitable arrangement of one or more planetary gearsets 1805, and/or any suitable configuration of brakes, clutches, synchronizers, and the like. The gearsets 1805 are optionally configured according to the present disclosure to provide three forward, and three reverse gear ratios. An output shaft 1806 of the transmission may be coupled to the gearsets 1705 according to the present disclosure to optionally provide power to a drive axle 1507. The power delivered by the transmission 1703 may include power provided by the internal combustion engine 1709, the electric motor 1702, or any combination thereof. One or more ground engaging members 1508 may be included and may be coupled to the output shaft 1506.

In another aspect, the drive system may be arranged and configured so that motor 1702, the transmission 1703, and the output shaft 1706 are aligned axially on a common axis 1510. This common axis 1510 may optionally be substantially perpendicular to the drive axle 1507. In another aspect, the input shaft 1804 receiving power from the electric motor 1802 may enter transmission 1803 from a side opposite the input shaft 1811, both of which optionally extend outwardly from the transmission 1803. A portion of the output shaft 1806 may by positioned within the input shaft 1804. The output shaft 1806 may, for example, extend outwardly away from the transmission and toward the drive axle 1507 from a side of transmission 1703 that is opposite input shaft 1811.

In another aspect, the transmission 1803 and gearsets 1805 may be mounted upstream of the motor 1802, and optionally downstream from engine 1709. Power optionally flows from the motor 1802 upstream through the input shaft 1804 and into the transmission 1803 where it may then transfer through the gearsets 1805 and to the output shaft 1806. Power may then flow downstream through the output shaft 1806 back through the motor 1802, and to drive axle 1507. In another aspect, power may flow downstream from engine 1709 via input shaft 1811 to engage the gearsets 1805. Power may then continue downstream to the drive axle 1507 via the output shaft 1806. The output shaft 1806 thus extends from the transmission 1803 to engage the drive axle 1507, and passes through a central cavity defined by the motor 1802.

Figure 19:
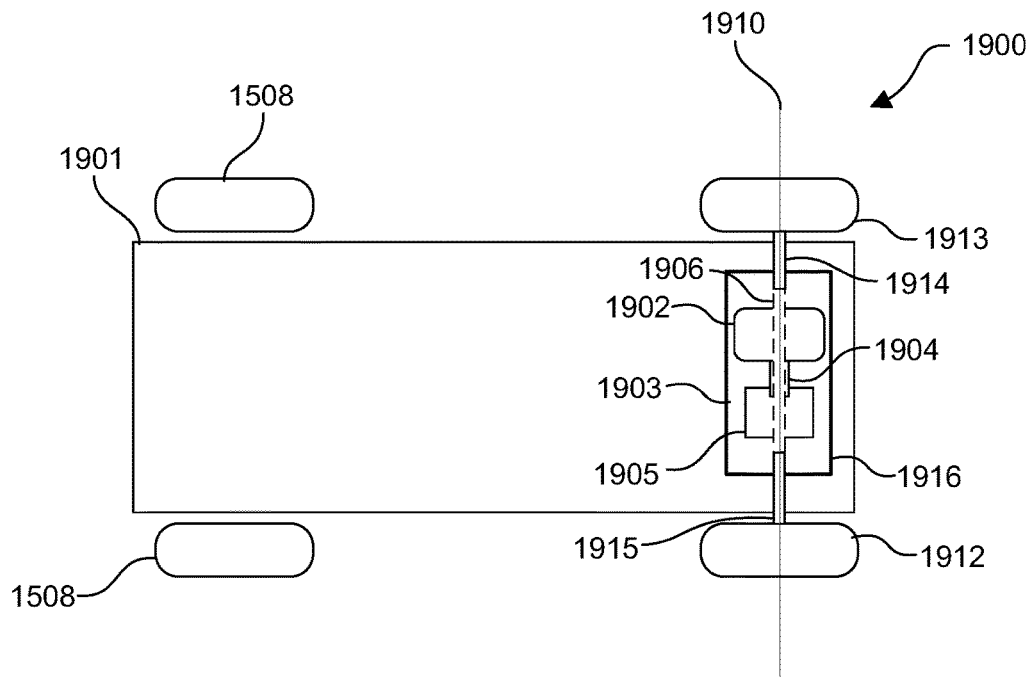
FIG. 19 is a diagram illustrating another example of the components and configuration of a drive system of the present disclosure.

FIG. 19 illustrates at 1900, another example of a vehicle 1901 that is like the vehicles of the preceding figures but with a different drive train arrangement. Vehicle 1901 optionally includes an electric motor 1902 which may be arranged and configured to provide torque to gearsets 1905 via an input shaft 1904. An output shaft 1906 may be included to carry power from the transmission 1903 to one or more drive axles 1914 and 1915. The three speed transmission may include an arrangement of one or more planetary gearsets 1905, and/or any suitable configuration of brakes, clutches, synchronizers, and the like. The gearsets 1905 are optionally configured according to the present disclosure to provide three forward, and three reverse gear ratios.

A drive axle 1914 may be configured to receive power from the output shaft 1906 and may be coupled to the gearsets 1905 according to the present disclosure to optionally provide power to a ground engaging member 1913. A separate drive axle 1915 may be configured to receive power from the output shaft 1906 and may be coupled to the gearsets 1905 according to the present disclosure to optionally provide power to another separate ground engaging member 1912. In another aspect, output shaft 1906 may be a split shaft with separate portions engaging the drive axles 1914 and 1915.

In another aspect, the drive system may be arranged and configured so that the electric motor 1902, the transmission 1903, and the drive axles 1914 and 1915 are optionally aligned axially on a common axis 1910. In another aspect, the drive axles 1914 and 1915 optionally pass through a housing of the transmission 1903 and engaging the gearsets 1905 via output shaft 1906. In another aspect, the motor 1902 and the transmission 1903 are optionally mounted axially on a common axis 1910 that is parallel to the drive axles 1914, 1915. In another aspect, at least two ground engaging elements 1912 and 1913 are optionally mounted to the drive axle 1915 and 1914 respectively, and the motor 1902 and transmission 1903 is optionally mounted between the ground engaging elements. The motor 1902 and the gearsets 1905 are optionally mounted within a common housing of transmission 1903. In another aspect, the drive axles 1914 and 1915 are positioned to engage the output shaft 1906, and the output shaft is optionally arranged to pass through the input shaft 1904 and an opening defined by the electric motor 1902 to provide torque to ground engaging members 1912 and 1913.

In another aspect, the gearsets 1905 may be mounted upstream of the motor 1902 with respect to a right ground engaging element 1913. Power optionally flows from the motor 1902 upstream through the input shaft and into the transmission 1903 where it may then transfer through the gearsets 1905 and to the drive axle 1914. Power may then flow downstream through the drive axle 1914 to the right ground engaging element 1913.

In another aspect, the gearsets 1905 may be mounted downstream of the motor 1902 with respect to a left ground engaging element 1912. Power optionally flows from the motor 1902 downstream to the gearsets 1905 where it may then transfer through the gearsets to the drive axle 1915. Power may then flow downstream through the drive axle 1915 to the left ground engaging element 1912. The drive axles 1914 thus optionally extends from the transmission 1903 without passing through the central cavity defined by the motor 1902.

Figure 20:
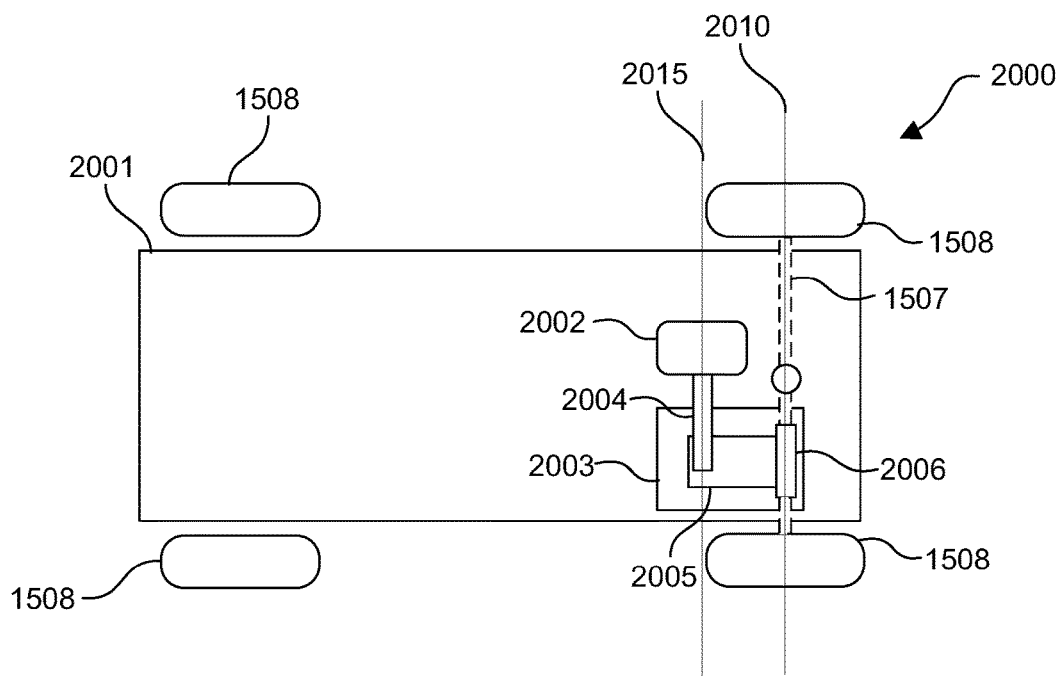
FIG. 20 is a diagram illustrating another example of the components and configuration of a drive system of the present disclosure.

FIG. 20 illustrates at 2000, another example of a vehicle 2001 that is like the vehicles of the preceding figures but with yet another different drive train arrangement. Vehicle 2001 optionally includes an electric motor 2002 which may be arranged and configured to provide torque to a transmission 2003 via an input shaft 2004. The three speed transmission may include an arrangement of one or more planetary gearsets 2005, and/or any suitable configuration of brakes, clutches, synchronizers, and the like. The gearsets 2005 are optionally configured according to the present disclosure to provide three forward, and three reverse gear ratios. A drive axle 1507 may be configured to receive power directly from the transmission 2003 via output shaft 2006. The output shaft 2006 may be coupled to the gearsets 2005 according to the present disclosure to optionally provide power to one or more ground engaging members 1508.

In another aspect, the drive system may be arranged and configured so that the electric motor 2002, the transmission 2003, and drive axle 1507 are optionally aligned axially on separate axes 2015 and 2010 respectively. In another aspect, the drive axle 1507 optionally passes through a housing of the transmission 2003 to engage the gearsets 2005 by either a single shaft, or multiple shaft portions, extending outwardly in opposite directions away from transmission 2003.

In another aspect, the electric motor 2002 and the input shaft 2004 may optionally be aligned on a separate axis 2015 that may be substantially parallel to axis 2010. The input shaft 2004 may be parallel to, but laterally offset from, the drive axle 1507 as shown. Gearsets 2005 may be configured to engage both the input shaft 2004 and the output shaft 2006. The output shaft 2006 optionally engages the drive axle 1507 which may be a single shaft, or multiple shaft portions, extending outwardly in opposite directions away from transmission 2003. A transmission housing of transmission 2003 is configured to retain the transmission including gearsets 2005 while the drive axle 1507 extends away from the transmission housing to engage at least two ground engaging elements 1508 such that the input shaft 2004 and the drive axle 1507 rotate on separate axes of rotation 2015 and 2010.

In another aspect, the transmission 2003 and gearsets 2005 may be mounted downstream of the motor 2002. Power optionally flows from the motor 2002 downstream to the transmission 2003 where it may then transfer through the gearsets 2005 and to the drive axle 1507. The drive axle 1507 thus optionally extends from the transmission 2003 without passing through the central cavity defined by the motor 2002. In another aspect, the drive axle 1507 passes through a housing of the transmission 2003 to engage the planetary gearsets 2005 within the housing of the transmission.

Figure 21:
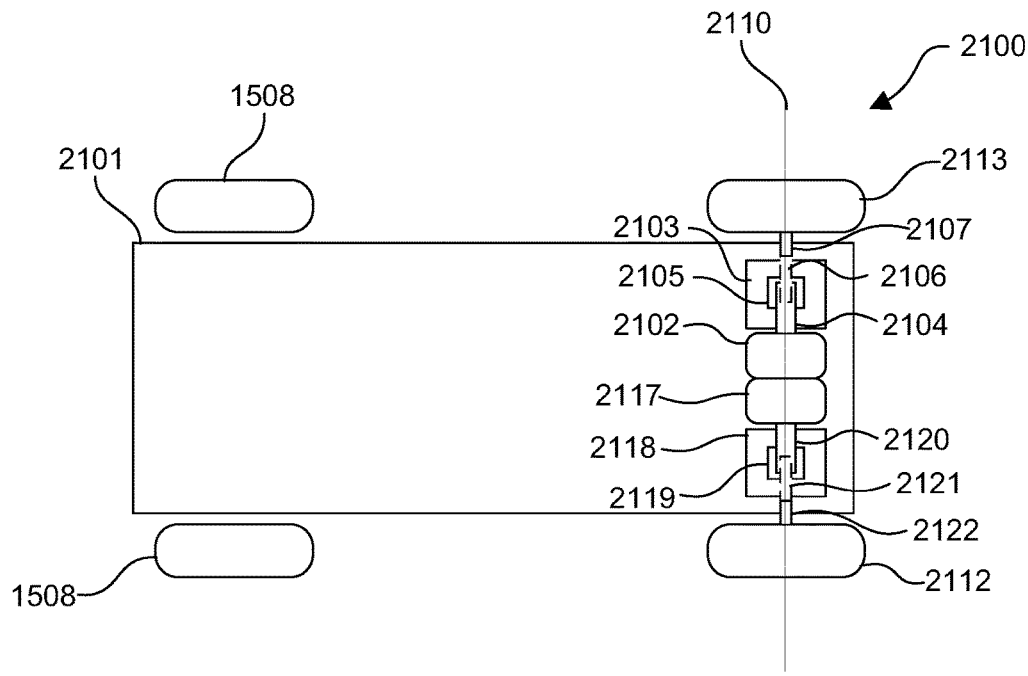
FIG. 21 is a diagram illustrating another example of the components and configuration of a drive system of the present disclosure.

FIG. 21 illustrates at 2100, another example of a vehicle 2101 that is like other vehicles of the preceding figures, but with another different drive train arrangement. Vehicle 2101 optionally includes a first electric motor 2102, and a second electric motor 2117 arranged and configured to provide torque separately to a first transmission 2103 and a second transmission 2118 via a first input shaft 2104 and a second input shaft 2120. The first electric motor 2102 is optionally coupled to the first transmission 2103 by input shaft 2104, and the second electric motor 2117 is optionally coupled to the second transmission 2118 by input shaft 2120.

In this example, the first and/or the second transmissions 2103 and 2118 optionally include a first gearset 2105 of the present disclosure, and a second gearset 2119 of the present disclosure. Both may include planetary gearsets, clutches, brakes, synchronizers, and the like according to the present disclosure. A first output shaft 2106 may be coupled to drive axle 2107. The drive axle 2107 is optionally coupled to a first ground engaging element 2113. A second output shaft 2121 of the second transmission 2118 is optionally coupled to a second drive axle 2122. The second drive axle 2122 is optionally coupled to a separate ground engaging element 2112 that is different from the first ground engaging element.

In another aspect, the first and second output shafts 2106 and 2121 are rotatable around a common axis of rotation 2110 with the drive axles 2107 and 2122. In another aspect, output shaft 2106 and drive axle 2107 may be a single continuous shaft coupled to ground engaging element 2113. Similarly, output shaft 2121 and drive axle 2122 may be a single continuous shaft coupled to ground engaging element 2112.

In another aspect, the first transmission 2103 and gearsets 2105 may be mounted downstream of the first motor 2102. Power optionally flows from the first motor 2102 downstream to the first transmission 2103 where it may then transfer through the gearsets 2105 and to the first drive axle 2107 via the first output shaft 2106.

In another aspect, the second transmission 2118 and gearsets 2119 may be mounted downstream of the second motor 2117. Power optionally flows from the second motor 2117 downstream to the second transmission 2118 where it may then transfer through the gearsets 2119 and to the second drive axle 2122 via the second output shaft 2121.

Figure 22:
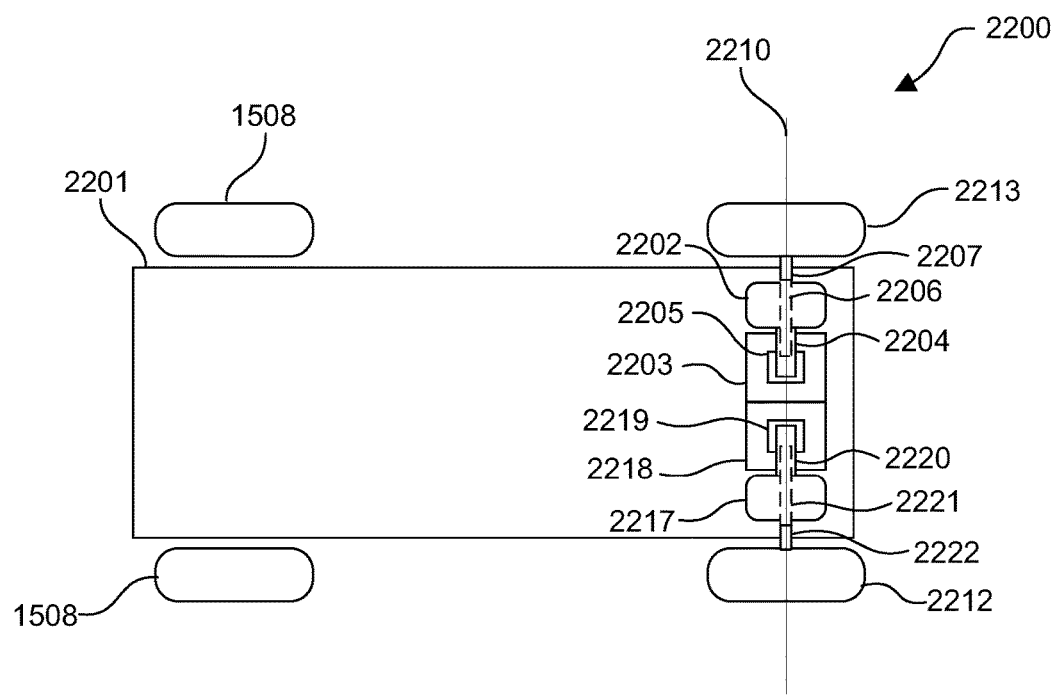
FIG. 22 is a diagram illustrating another example of the components and configuration of a drive system of the present disclosure.

FIG. 22 illustrates at 2200, another example of a vehicle 2201 that is like other vehicles of the preceding figures, but with another different drive train arrangement. Vehicle 2201 optionally includes a first electric motor 2202, and a second electric motor 2217 arranged and configured to provide torque separately to a first transmission 2203 and a second transmission 2218 via a first input shaft 2204 and a second input shaft 2220. The first electric motor 2202 is optionally coupled to the first transmission 2203 by an input shaft 2204, and the second electric motor 2217 is optionally coupled to the second transmission 2218 by an input shaft 2220. In this example, the first and/or the second transmissions 2203 and 2218 optionally include a first gearset 2205 of the present disclosure, and a second gearset 2219 of the present disclosure. Both may include planetary gearsets, clutches, brakes, synchronizers, and the like according to the present disclosure.

A first output shaft 2206 may be coupled to drive axle 2207. The drive axle 2207 is optionally coupled to a first ground engaging element 2213. A second output shaft 2221 of the second transmission 2218 is optionally coupled to a second drive axle 2222. The second drive axle 2222 is optionally coupled to a separate ground engaging element 2212 that is different from the first ground engaging element 2213.

In another aspect, the first and second output shafts 2206 and 2221 are optionally rotatable around a common axis of rotation 2210 with the drive axles 2207 and 2222. In another aspect, output shaft 2206 and drive axle 2207 may be a single continuous shaft coupled to ground engaging element 2213. Similarly, output shaft 2221 and drive axle 2222 may be a single continuous shaft coupled to ground engaging element 2212.

In another aspect, the first transmission 2203 and gearsets 2205 may be mounted upstream of the first motor 2202. Power optionally flows from the first motor 2202 upstream to the first transmission 2203 where it may then transfer through the gearsets 2205 to the output shaft 2206. Output shaft 2206 may then pass back through the first motor 2202 to engage the first drive axle 2207. The output shaft 2206 may optionally pass through at least a portion of the input shaft 2204 to engage the gearset 2205 with the drive axle 2207.

In another aspect, the second transmission 2218 and gearsets 2219 may be mounted downstream of the second motor 2217. Power optionally flows from the second motor 2217 upstream to the second transmission 2218 where it may then transfer through the gearsets 2219 to the output shaft 2221. Output shaft 2221 may then pass back through the second motor 2217 to engage the second drive axle 2207. The output shaft 2221 may optionally pass through at least a portion of the input shaft 2220 to engage the gearset 2219 with the drive axle 2222.

Figure 23:
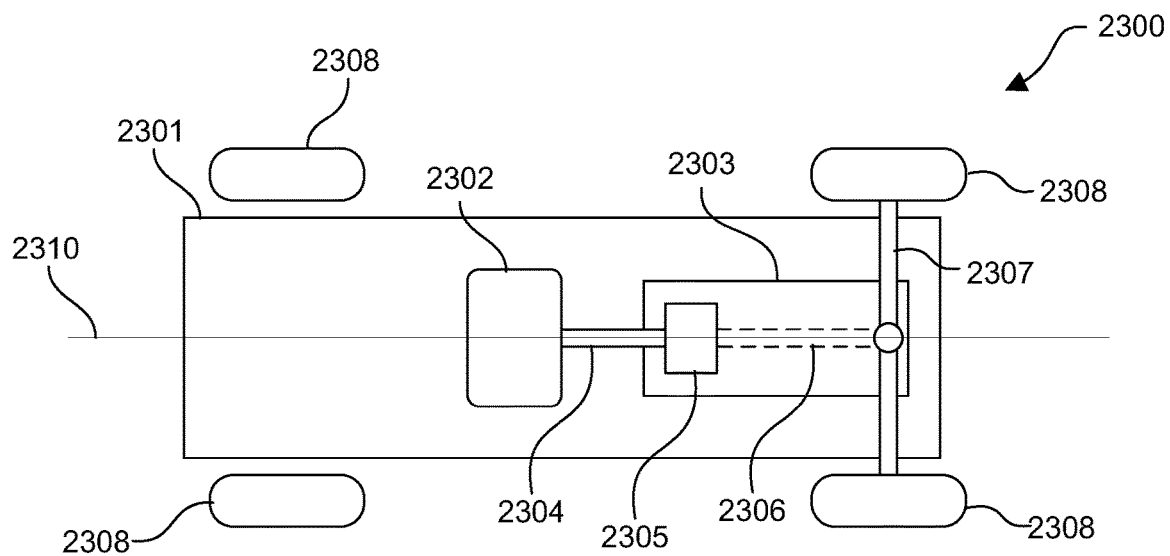
FIG. 23 is a diagram illustrating another example of the components and configuration of a drive system of the present disclosure.

In FIG. 23 at 2300, a vehicle 2301 is shown that optionally includes an electric motor 2302 which may be arranged and configured to provide torque to a transmission 2303 via an input shaft 2304. The three speed transmission may include an arrangement of one or more planetary gearsets 2305, and/or any suitable configuration of brakes, clutches, synchronizers, and the like as disclosed herein. The gearsets 2305 are optionally configured according to the present disclosure to provide three forward, and three reverse gear ratios. An output shaft 2306 of the transmission may be coupled to the gearsets 2305 according to the present disclosure to optionally provide power to a drive axle 2307. One or more ground engaging members 2308 may be included and may be coupled to the output shaft 2306. These ground engaging members may include, for example, tires, wheels, belts, tracks, and the like, or any combination thereof.

In another aspect, the drive system may be arranged and configured so that the motor 2302, the transmission 2303, and the output shaft 2306 are aligned axially on a common axis 2310. This common axis 2310 may optionally be substantially perpendicular to the drive axle 2307. In another aspect, the input shaft 2304 receiving power from the electric motor 2302 may extend outwardly toward the motor 2302 in a different direction from the output shaft 2306. The output shaft 2306 may extend outwardly away from the transmission 2303 and toward the drive axle 2307. In this configuration, the input shaft 2304 and the output shaft 2306 may extend out from the transmission 2303 in opposite directions. In another aspect, the drive axle 2307 optionally passes through a housing of the transmission 2303, and the output shaft 2306 is optionally contained within the housing of the transmission 2303.

In another aspect, the transmission 2303 and gearsets 2305 may be mounted downstream of the motor. Power optionally flows from the motor 2302 through the input shaft 2304 and into the transmission 2303 where it may then transfer through the gearsets 2305 and to the output shaft 2306. Power may then continue through the output shaft 2306 downstream to the drive axle 2307, and eventually to the ground engaging elements 2308.

Figure 24:
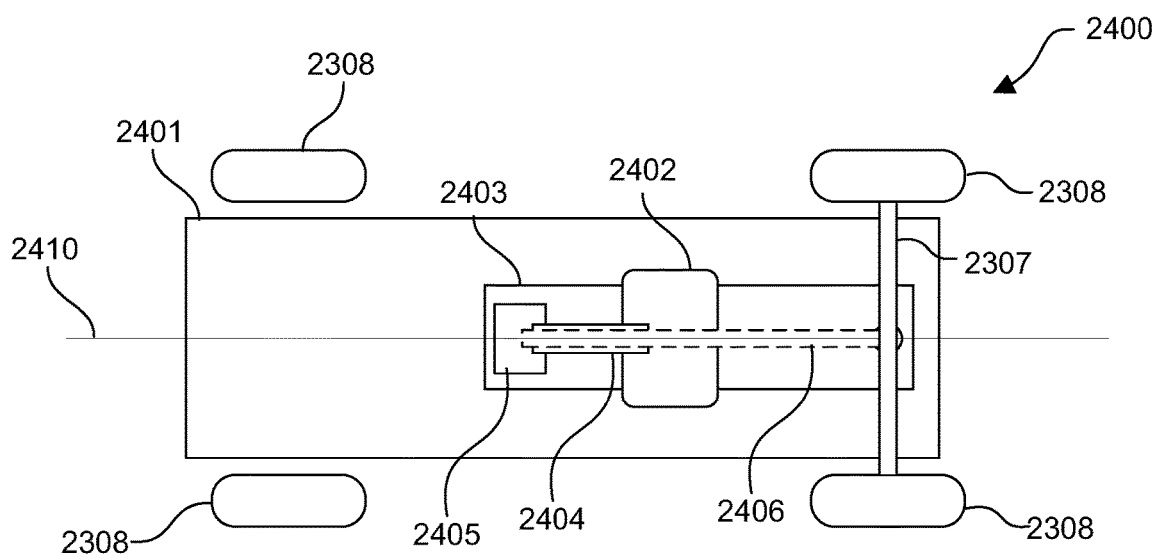
FIG. 24 is a diagram illustrating another example of the components and configuration of a drive system of the present disclosure.

FIG. 24 illustrates at 2400, another example of a vehicle 2401 that is like the vehicles of the preceding figures but with a different drive train arrangement. Vehicle 2401 optionally includes an electric motor 2402 which may be arranged and configured to provide torque to a transmission 2403 via an input shaft 2404. The three speed transmission may include an arrangement of one or more planetary gearsets 2405, and/or any suitable configuration of brakes, clutches, synchronizers, and the like as disclosed herein. The gearsets 2405 are optionally configured according to the present disclosure to provide three forward, and three reverse gear ratios. An output shaft 2406 of the transmission may be coupled to the gearsets 2405 according to the present disclosure to optionally provide power to a drive axle 2307. One or more ground engaging members 2308 may be included and may be coupled to the output shaft 2306.

In another aspect, the drive system may be arranged and configured so that the motor 2402, the transmission 2403, and the output shaft 2406 are aligned axially on a common axis 2410. This common axis 2410 may optionally be substantially perpendicular to the drive axle 2307. In another aspect, the input shaft 2404 receiving power from the electric motor 2402 may extend outwardly toward the motor 2402 in the opposite direction as the output shaft 2406 which may extend outwardly away from the transmission and toward the drive axle. In another aspect, the output shaft 2406 optionally passes through an opening defined by the input shaft 2404 and through an opening defined by the electric motor 2402 to engage with the drive axle 2307. In another aspect, the drive axle 2307 optionally passes through a housing of the transmission 2403, and the output shaft 2406 is optionally contained within the housing of the transmission 2403.

In another aspect, the gearsets 2405 may be mounted upstream of the motor 2402 in the transmission 2404. Power optionally flows from the motor 2402 upstream through the input shaft 2404 and into the gearsets 2405 of the present disclosure where it may then transfer through the gearsets and to the output shaft 2406. Power may then flow downstream through the output shaft 2406 back through the motor 2402, and to drive axle 2307. The output shaft 2406 thus extends from the transmission 2403 to engage the drive axle 2307, and passes through a central cavity defined by the motor 2402.

The concepts illustrated and disclosed herein related to a drive system may be arranged and configured according to any of the following non-limiting numbered examples:

Example 1: A drive system that includes a first and a second planetary gearset having a sun gear, carrier with planetary gears, and a ring gear, wherein the carrier of the first planetary gearset is coupled to the ring gear of the second planetary gearset, and wherein the ring gear of the first planetary gearset is coupled to the sun gear of the second planetary gearset.

Example 2: The drive system of any preceding Example optionally including an input shaft coupled to the sun gear of the first planetary gearset.

Example 3: The drive system of any preceding Example optionally including a first brake operable to selectively couple the carrier of the second planetary gearset to ground.

Example 4: The drive system of any preceding Example optionally including a second brake operable to selectively couple the ring gear of the first planetary gearset and the sun gear of the second planetary gearset to ground.

Example 5: The drive system of any preceding Example optionally including a clutch operable to selectively couple the input shaft to the first and second planetary gearsets to provide a 1:1 gear ratio between the input shaft and the output shaft.

Example 6: The drive system of any preceding Example, wherein the clutch is operable to selectively couple the input shaft to the sun gear of the second planetary gearset.

Example 7: The drive system of any preceding Example optionally including a housing that at least partially surrounds the first and second planetary gearsets, wherein the housing operates as a ground.

Example 8: The drive system of any preceding Example, wherein the input shaft and the sun gear of the first planetary gearset are coupled to an input side of the clutch.

Example 9: The drive system of any preceding Example, wherein the sun gear of the second planetary gearset is coupled to an output side of the clutch.

Example 10: The drive system of any preceding Example, wherein the first brake, the second brake, and the clutch are each engaged separately at different times to provide three separate speed ratios of the input shaft relative to the output shaft.

Example 11: The drive system of any preceding Example, wherein engaging the first brake provides a first gear ratio of the three separate speed ratios that is greater than 5:1.

Example 12: The drive system of any preceding Example, wherein engaging the second brake provides a second gear ratio of the three separate speed ratios that is greater than 2:1.

Example 13: The drive system of any preceding Example, wherein engaging the clutch provides a third gear ratio of the three separate speed ratios that is about 1:1.

Example 14: The drive system of any preceding Example, wherein either the first or the second brake includes a dog clutch.

Example 15: The drive system of any preceding Example, wherein the second brake and the first clutch are coupled to opposite sides of a synchronizer.

Example 16: The drive system of any preceding Example, wherein the first or the second brake include a friction braking mechanism.

Example 17: The drive system of any preceding Example, wherein the rotational direction of the input shaft is directly linked to the rotational direction of the output shaft.

Example 18: The drive system of any preceding Example, optionally including an electric motor coupled to the input shaft.

Example 19: The drive system of any preceding Example, optionally including one or more ground engaging members coupled to the output shaft.

Example 20: The drive system of any preceding Example, wherein the motor, the transmission, and the output shaft are aligned axially on a common axis perpendicular to a drive axle.

Example 21: The drive system of any preceding Example, wherein the output shaft passes through the input shaft and the electric motor to engage with the drive axle.

Example 22: The drive system of any preceding Example, wherein the output shaft extends from the transmission to engage the drive axle.

Example 23: The drive system of any preceding Example, wherein the wheel axle passes through a housing of the transmission and the output shaft is contained within the housing of the transmission.

Example 24: The drive system of any preceding Example, wherein the motor and transmission are mounted axially on a common axis that is parallel to the drive axle.

Example 25: The drive system of any preceding Example, optionally including at least two ground engaging elements mounted to the drive axle, wherein the motor and transmission are mounted between the at least two ground engaging elements.

Example 26: The drive system of any preceding Example, wherein the output shaft of the transmission passes through the input shaft and the electric motor to engage with the drive axle.

Example 27: The drive system of any preceding Example, wherein the output shaft of the transmission and the input shaft of the motor are aligned on a common axis of rotation with the drive axle.

Example 28: The drive system of any preceding Example, optionally including a transmission housing configured to retain the transmission, wherein the drive axle extends away from the transmission housing to engage the at least two ground engaging elements, and wherein the input shaft and the drive axle rotate on separate axes of rotation that are parallel to each other.

Example 29: The drive system of any preceding Example, wherein the transmission is mounted downstream of the motor.

Example 30: The drive system of any preceding Example, wherein the transmission is mounted upstream of the motor.

Example 26: The drive system of any preceding Example, further including a second electric motor providing torque separately to a second transmission via a second input shaft coupling the second electric motor to the second transmission.

Example 27: The drive system of any preceding Example, wherein the first or second transmissions include a planetary gearset having a sun gear, carrier with planetary gears, and a ring gear, wherein the carrier of the first planetary gearset is coupled to the ring gear of the second planetary gearset.

Example 28: The drive system of any preceding Example, wherein the ring gear of the first planetary gearset is coupled to the sun gear of the second planetary gearset, wherein the input shaft is coupled to the sun gear of the first planetary gearset.

Example 29: The drive system of any preceding Example, optionally including a first brake operable to selectively couple the carrier of the second planetary gearset to ground in the first or second planetary gearset.

Example 30: The drive system of any preceding Example, optionally including a second brake operable to selectively couple the ring gear of the first planetary gearset and the sun gear of the second planetary gearset to ground in the first or second planetary gearset.

Example 31: The drive system of any preceding Example, optionally including a clutch operable to selectively couple the input shaft to the first and second planetary gearsets.

Example 32: The drive system of any preceding Example, optionally including an output shaft coupled to the carrier of the first planetary gearset and the ring gear of the second planetary gearset.

Example 33: The drive system of any preceding Example, wherein the output shaft of a first transmission is coupled to a first ground engaging element, and the output shaft of a second transmission is coupled to a second ground engaging element that is separate from the first ground engaging element.

Example 34: The drive system of any preceding Example, wherein the first and second output shafts are rotatable around a common axis of rotation with the drive axle.

Example 35: The drive system of any preceding Example, wherein a first transmission is mounted downstream of a first motor, and a second transmission is mounted downstream of a second motor.

Example 36: The drive system of any preceding Example, wherein a first transmission is mounted upstream of the first motor, and a second transmission is mounted upstream of a second motor.

Glossary of Definitions and Alternatives

While the invention is illustrated in the drawings and described herein, this disclosure is to be considered as illustrative and not restrictive in character. The present disclosure is exemplary in nature and all changes, equivalents, and modifications that come within the spirit of the invention are included. The detailed description is included herein to discuss aspects of the examples illustrated in the drawings for the purpose of promoting an understanding of the principles of the invention. No limitation of the scope of the invention is thereby intended. Any alterations and further modifications in the described examples, and any further applications of the principles described herein are contemplated as would normally occur to one skilled in the art to which the invention relates. Some examples are disclosed in detail, however some features that may not be relevant may have been left out for the sake of clarity.

Where there are references to publications, patents, and patent applications cited herein, they are understood to be incorporated by reference as if each individual publication, patent, or patent application were specifically and individually indicated to be incorporated by reference and set forth in its entirety herein.

Singular forms "a", "an", "the", and the like include plural referents unless expressly discussed otherwise. As an illustration, references to "a device" or "the device" include one or more of such devices and equivalents thereof.

Directional terms, such as "up", "down", "top" "bottom", "fore", "aft", "lateral", "longitudinal", "radial", "circumferential", etc., are used herein solely for the convenience of the reader in order to aid in the reader's understanding of the illustrated examples. The use of these directional terms does not in any manner limit the described, illustrated, and/or claimed features to a specific direction and/or orientation.

Multiple related items illustrated in the drawings with the same part number which are differentiated by a letter for separate individual instances, may be referred to generally by a distinguishable portion of the full name, and/or by the number alone. For example, if multiple "laterally extending elements" 90A, 90B, 90C, and 90D are illustrated in the drawings, the disclosure may refer to these as "laterally extending elements 90A-90D," or as "laterally extending elements 90," or by a distinguishable portion of the full name such as "elements 90".

The language used in the disclosure are presumed to have only their plain and ordinary meaning, except as explicitly defined below. The words used in the definitions included herein are to only have their plain and ordinary meaning. Such plain and ordinary meaning is inclusive of all consistent dictionary definitions from the most recently published Webster's and Random House dictionaries. As used herein, the following definitions apply to the following terms or to common variations thereof (e.g., singular/plural forms, past/present tenses, etc.):

"About" with reference to numerical values generally refers to plus or minus 10% of the stated value. For example if the stated value is 4.375, then use of the term "about 4.375" generally means a range between 3.9375 and 4.8125.

"Activate" generally is synonymous with "providing power to", or refers to "enabling a specific function" of a circuit or electronic device that already has power.

"And/Or" generally refers to a grammatical conjunction indicating that one or more of the cases it connects may occur. For instance, it can indicate that either or both of two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Axis" generally refers to a straight line about which a body, object, and/or a geometric figure rotates or may be conceived to rotate.

"Bearing" generally refers to a machine element that constrains relative motion and reduces friction between moving parts to only the desired motion, such as a rotational movement. The bearing for example can be in the form of loose ball bearings found in a cup and cone style hub. The bearing can also be in the form of a cartridge bearing where ball bearings are contained in a cartridge that is shaped like a hollow cylinder where the inner surface rotates with respect to the outer surface by the use of ball or other types of bearings.

"Brake" generally refers to a device for arresting and/or preventing the motion of a mechanism usually via friction, electromagnetic, and/or other forces. Brakes for example can include equipment in automobiles, bicycles, or other vehicles that are used to slow down and/or stop the vehicle. In other words, a brake is a mechanical device that inhibits motion by absorbing energy from a moving system. The brake can be for example used for slowing or stopping a moving vehicle, wheel, and/or axle, or to prevent its motion. Most often, this is accomplished by friction. Types of brakes include frictional, pressure, and/or electromagnetic type braking systems. Frictional brakes for instance can include caliper, drum, and/or disc drakes. Electromagnetic braking systems for example can include electrical motor/generators found in regenerative braking systems.

"Clutch" generally refers to a device that engages and disengages mechanical power transmission between two or more rotating shafts or other moving components. In one example, one shaft is typically attached to an engine, motor, or other power source, which acts as the driving member, while the other shaft (i.e., the driven member) provides output power for work. While the motions involved are usually rotary motions, linear clutches are also used to engage and disengage components moving with a linear or near linear motion. The clutch components can for instance be engaged and disengaged through mechanical, hydraulic, and/or electrical actuation. The clutches can include positive type clutches and friction type clutches. Wet type clutches are typically immersed in a cooling lubrication liquid or other fluid, and dry clutches are not bathed in such liquids. Some non-limiting examples of clutches include cone clutches, centrifugal clutches, torque limiter clutches, axial clutches, disc clutches, dog clutches, and rim clutches, to name just a few.

"Contact" generally refers to a condition and/or state where at least two objects are physically touching. For example, contact requires at least one location where objects are directly or indirectly touching, with or without any other member(s) material in between.

"Dog Clutch" generally refers to a type of positive clutch that couples and decouples at least two rotating shafts or other rotating mechanical components by an interference type connection. The two parts of the clutch are designed such that one will push the other, thereby causing both to rotate at the same speed with no (or very minimal) slippage. Typically, but not always, one part of the dog clutch includes a series of teeth or other protrusions that are configured to mate with another part of the dog clutch that includes corresponding recesses for receiving the teeth or protrusions. Unlike friction clutches that allow slippage, dog clutches are used where slip is undesirable and/or the clutch is not used to control torque. Without slippage, dog clutches are not affected by wear in the same manner as friction clutches.

"Downstream" generally refers to a direction or relative location that is the same as where power flows in a system.

"Electric Motor" generally refers to an electrical machine that converts electrical energy into mechanical energy. Normally, but not always, electric motors operate through the interaction between one or more magnetic fields in the motor and winding currents to generate force in the form of rotation. Electric motors can be powered by direct current (DC) sources, such as from batteries, motor vehicles, and/or rectifiers, or by alternating current (AC) sources, such as a power grid, inverters, and/or electrical generators. An electric generator can (but not always) be mechanically identical to an electric motor, but operate in the reverse direction, accepting mechanical energy and converting the mechanical energy into electrical energy.

"Fastener" generally refers to a hardware device that mechanically joins or otherwise affixes two or more objects together. By way of nonlimiting examples, the fastener can include bolts, dowels, nails, nuts, pegs, pins, rivets, screws, and snap fasteners, to just name a few.

"Gear Train" generally refers to a system of gears that transmit power from one mechanical component to another. For example, a gear train can include a combination of two or more gears, mounted on rotating shafts, to transmit torque and/or power. As one non-limiting example, the gear train for instance can include a planetary gearset.

"Ground" or "Mechanical Ground" generally refers to a physical structure useful for holding one or more mechanical objects stationary relative to that physical structure. When used as a verb, "grounding" a mechanical object in motion generally refers to slowing the mechanical motion to a halt relative to the grounding structure and maintaining it in place.

"High Speed Motor" generally refers to a motor that has a maximum output speed of at least 5,000 rpm (rotations per minute) without the use of gear trains or other similar equipment for boosting speed.

"Interchangeable" generally refers to two or more things that are capable of being put and/or used in place of each other. In other words, one thing is capable of replacing and/or changing places with something else. For example, interchangeable parts typically, but not always, are manufactured to have nearly the same structural size as well as shape within normal manufacturing tolerances and have nearly the same operational characteristics so that one part can be replaced by another interchangeable part. In some cases, the interchangeable parts can be manufactured and/or sold by a specific company under the same part or Stock Keeping Unit (SKU) identifier, and in other cases, different companies can manufacture and/or sell the same interchangeable parts.

"Interruptible Connection" generally refers to a mechanical linkage between two mechanical components that has the ability to break continuity during normal operation such that the components can be mechanically disconnected and reconnected if so desired. When disconnected, the components are unable to provide mechanical power to one another. The interruptible connection can include multiple components such as multiple shafts and gears that engage with one another. The interruptible connection includes at least one mechanism, such as a clutch, that is designed to disconnect and reconnect the mechanical linkage between the components during normal operation.

"Lateral" generally refers to being situated on, directed toward, or coming from the side.

"Longitudinal" generally relates to length or lengthwise dimension of an object, rather than across.

"Low Speed Motor" generally refers to a motor that has a maximum output speed of less than 5,000 rpm (rotations per minute) without the use of gear trains or other similar equipment for boosting speed.

"Means For" in a claim invokes 35 U.S.C. 112(f), literally encompassing the recited function and corresponding structure and equivalents thereto. Its absence does not, unless there otherwise is insufficient structure recited for that claim element. Nothing herein or elsewhere restricts the doctrine of equivalents available to the patentee.

"Motor" generally refers to a machine that supplies motive power for a device with moving parts. The motor can include rotor and linear type motors. The motor can be powered in any number of ways, such as via electricity, internal combustion, pneumatics, and/or hydraulic power sources. By way of non-limiting examples, the motor can include a servomotor, a pneumatic motor, a hydraulic motor, a steam engine, pneumatic piston, hydraulic piston, and/or an internal combustion engine.

"Multiple" as used herein is synonymous with the term "plurality" and refers to more than one, or by extension, two or more.

"Optionally" means discretionary; not required; possible, but not compulsory; left to personal choice.

"Planetary Gear" or "Planetary Gearset" generally refers to a system of at least two gears mounted so that the center of at least one gear revolves around the center of the other. In other words, the planetary gear includes a system of epicyclic gears in which at least one gear axis revolves about the axis of another gear. In one example, a carrier connects the centers of the two gears and rotates to carry one gear, which is called a planet gear, around the other, which is commonly called a sun gear. Typically, but not always, the planet and sun gears mesh so that their pitch circles roll without slip. A point on the pitch circle of the planet gear normally traces an epicycloid curve. In one simplified case, the sun gear is fixed and the one or more planet gears roll around the sun gear. In other examples, an epicyclic gear train can be assembled so the planet gear rolls on the inside of the pitch circle of a fixed, outer gear ring, or ring gear, that is sometimes called an annular gear. In this case, the curve traced by a point on the pitch circle of the planet gear is a hypocycloid. A planetary gear is typically used to transfer large torque loads in a compact form.

"Portion" means a part of a whole, either separated from or integrated with it.

"Positive Clutch" generally refers to a type of clutch that is designed to transmit torque without slippage such as through a mechanical interference type connection. Some examples of positive clutches include jaw clutches (e.g., square or spiral jaw clutches) and dog clutches.

"Powertrain" generally refers to devices and/or systems used to transform stored energy into kinetic energy for propulsion purposes. The powertrain can include multiple power sources and can be used in non-wheel-based vehicles. By way of non-limiting examples, the stored energy sources can include chemical, solar, nuclear, electrical, electrochemical, kinetic, and/or other potential energy sources. For example, the powertrain in a motor vehicle includes the devices that generate power and deliver the power to the road surface, water, and/or air. These devices in the powertrain include engines, motors, transmissions, drive shafts, differentials, and/or final drive components (e.g., drive wheels, continuous tracks, propeller, thrusters, etc.).

"Predominately" as used herein is synonymous with greater than 50%.

"Rated Continuous Power" or "Continuous Rated Power" generally refer to an amount of energy or work provided per unit of time (i.e., power) an electric motor will produce without interruption for a rated speed, at a rated torque, and at a rated voltage for the electric motor. In other words, the rated continuous power is usually the power that the electric motor can produce for a long period of time at the rated speed and the rated torque without damaging the electric motor.

"Rated Operating Speed" or "Rated Speed" generally refers to a velocity (i.e., speed) an electric motor will rotate when producing a rated continuous power at a supplied rated voltage for the electric motor. Typically, but not always, the rated operating speed is measured in terms of Revolutions Per Minute (rpm). Generally speaking, the rated operating speed is the prescribed rpm at which the motor operates, keeping the mechanical stability and efficiency of the electric motor in mind. The rated voltage and rated horsepower respectively refer to the maximum voltage and horsepower (hp) where the motor can operate efficiently without being damaged. The value for the rated operating speed will be slightly less than a synchronous speed of the electric motor due to a decrease in speed caused by adding a load (i.e., slip or speed loss). For instance, most alternating current (AC) induction motors with synchronous speeds of 1800 RPM will have normally have rated speeds ranging between about 1720 and about 1770 RPM depending on the amount of slip. Some newer high or energy-efficient electric motors will tend to have rated operating speeds towards a higher end of the range.

"Rated Continuous Torque" or "Continuous Rated Torque" generally refer to a magnitude of twisting force, or torque, an electric motor will produce without interruption for a rated speed and at a rated voltage for the electric motor. In other words, the rated continuous torque is usually a torque that the electric motor can output for a long period of time at the rated speed without damaging the electric motor. Typically, this value is generated close to the maximum speed of the motor.

"Rotor" generally refers to a part or portion in a machine that rotates in or around a stationary part, which is commonly referred to as a stator. The rotor is the moving or rotating part of a rotary system, such as found in electric generators, electric motors, sirens, mud motors, turbines, and/or biological rotors. In one particular non-limiting example, the rotor includes the rotating portion of an electric generator and/or motor, especially of an induction motor.

"Selectable One-Way Clutch" (SOWC) generally refers to a type of clutch that is able to be controlled to lock in at least one rotational direction. One-way clutches are usually (but not always) designed to transfer torque or lock when rotated in one direction and to allow rotational movement or free-wheel when rotated in the opposite direction. The SOWC is a type of one-way clutch that can be used to control when and/or in which direction the rotational motion is locked or able to rotate freely. By way of a non-limiting example, the SOWC can be activated to lock so as to transfer torque when torque is applied in one rotational direction and facilitate free-wheel or slipping movement in the opposite rotational direction. In other variations, the SOWC can be controlled at times to facilitate free-wheel motion in both rotational directions or locked to allow torque transfer in both rotational directions. Alternatively or additionally, the SOWC can be controlled to switch or change the locked and free-wheel rotational directions. For example, the SOWC under one operating condition can be locked when rotated in a counterclockwise and free-wheel spin in the clockwise direction, and under other conditions, the SOWC can be switched so that the SOWC is locked in the clockwise direction and free-wheel spin in the counterclockwise direction. Some non-limiting examples of SOWC designs include roller, sprag, spiral, and mechanical diode type designs. The SOWC can be controlled or actuated in a number of ways such as through mechanical and/or electrical actuation. For instance, the SOWC can be actuated with hydraulic, pneumatic, and/or electrical type actuators to name just a few.

"Stator" generally refers to a stationary part or portion in a machine in or about which a rotating part revolves, which is commonly referred to as a rotor. The stator is the stationary part of a rotary system, such as found in electric generators, electric motors, sirens, mud motors, turbines, and/or biological rotors. In one particular non-limiting example, the stator includes the stationary portion of an electric generator and/or motor, especially of an induction motor.

"Substantially" generally refers to the degree by which a quantitative representation may vary from a stated reference without resulting in an essential change of the basic function of the subject matter at issue. The term "substantially" is utilized herein to represent the inherent degree of uncertainty that may be attributed to any quantitative comparison, value, measurement, and/or other representation.

"Symmetric" or "Symmetrical" generally refer to a property of something having two sides or halves that are the same relative to one another, such as in shape, size, and/or style. In other words, symmetric describes something as having a mirror-image quality.

"Synchronizer" or "Synchronizer Mechanism" ("Synchromesh") generally refer to a device that includes a cone clutch and a blocking ring which brings the speeds of a gear and a gear selector to the same speed using friction. In one example, before the teeth of the gear and gear selector can engage, the cone clutch engages first which in turn brings the gear selector and gear to the same speed using friction. Until synchronization occurs, the teeth of the gear and the gear selector are prevented from making contact by the blocking ring. When synchronization occurs, the friction on the blocking ring is relieved and the blocking ring twists slightly. With this twisting motion, grooves or notches are aligned that allow further passage of the gear selector which brings the teeth together.

"Transmission" generally refers to a power system that provides controlled application of mechanical power. The transmission uses gears and/or gear trains to provide speed, direction, and/or torque conversions from a rotating power source to another device.

"Transverse" generally refers to things, axes, straight lines, planes, or geometric shapes extending in a non-parallel and/or crosswise manner relative to one another. For example, when in a transverse arrangement, lines can extend at right angles or perpendicular relative to one another, but the lines can extend at other non-straight angles as well such as at acute, obtuse, or reflex angles. For instance, transverse lines can also form angles greater than zero (0) degrees such that the lines are not parallel. When extending in a transverse manner, the lines or other things do not necessarily have to intersect one another, but they can.

"Uninterrupted Connection" generally refers to a mechanical linkage between two mechanical components without any break in continuity such that mechanical force can be transmitted on a continuous basis if so desired. The uninterrupted connection does not require a unitary connection such that the uninterrupted connection can include multiple components such as multiple shafts and gears that engage with one another. The uninterrupted connection lacks mechanisms or other structures, such as clutches, that are designed to disconnect and reconnect the mechanical linkage between the components during normal operation. It should be recognized that the uninterrupted connection can occasionally have accidental breakages that disconnect the components, but the design of the uninterrupted connection is not designed to facilitate such breakages and resulting disconnections.

"Upstream" generally refers to a direction or relative location that is opposite from where power flows in a system.

"Vehicle" generally refers to a machine that transports people and/or cargo. Common vehicle types can include land based vehicles, amphibious vehicles, watercraft, aircraft, and space craft. By way of non-limiting examples, land based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket-powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

What is claimed is:

1. A drive system, comprising:
   a first and a second planetary gearset having a sun gear, a carrier with planetary gears, and a ring gear, wherein the carrier of the first planetary gearset is directly coupled to the ring gear of the second planetary gearset, and wherein the ring gear of the first planetary gearset is coupled to the sun gear of the second planetary gearset, and wherein the first planetary gearset is downstream from the second planetary gearset;
   an input shaft coupled to the sun gear of the first planetary gearset, wherein the input shaft passes through the second planetary gearset to reach to first planetary gearset;
   a first brake operable to selectively couple the carrier of the second planetary gearset to ground;
   a second brake operable to selectively couple the ring gear of the first planetary gearset and the sun gear of the second planetary gearset to ground; and
   a clutch operable to selectively couple the input shaft to the first and second planetary gearsets to provide a 1:1 gear ratio between the input shaft and an output shaft;
   wherein the second brake and the first clutch are coupled to opposite sides of a synchronizer.

2. The drive system of claim 1, wherein the clutch is operable to selectively couple the input shaft to the sun gear of the second planetary gearset.

3. The drive system of claim 1, comprising:
   a housing that at least partially surrounds the first and second planetary gearsets, wherein the housing operates as the ground.

4. The drive system of claim 1, wherein the input shaft and the sun gear of the first planetary gearset are coupled to an input side of the clutch, and wherein the sun gear of the second planetary gearset is coupled to an output side of the clutch.

5. The drive system of claim 1, wherein the first brake, the second brake, and the clutch are each engaged separately at different times to provide three separate speed ratios of the input shaft relative to the output shaft.

6. The drive system of claim 5, wherein engaging the first brake provides a first gear ratio of the three separate speed ratios that is greater than 5:1.

7. The drive system of claim 5, wherein engaging the second brake provides a second gear ratio of the three separate speed ratios that is greater than 2:1.

8. The drive system of claim 5, wherein engaging the clutch provides a third gear ratio of the three separate speed ratios that is about 1:1.

9. The drive system of claim 1, wherein either the first or the second brake includes a dog clutch.

10. The drive system of claim 1, wherein the first or the second brake include a friction braking mechanism.

11. The drive system of claim 1, wherein rotational direction of the input shaft is directly linked to rotational direction of the output shaft.

12. The drive system of claim 1, comprising:
    an electric motor coupled to the input shaft.

13. The drive system of claim 1, comprising:
    one or more ground engaging members coupled to the output shaft.

14. The drive system of claim 1, comprising:
an electric motor, wherein the electric motor, the first and second planetary gearsets, and the output shaft, are aligned axially on a common axis perpendicular to a drive axle.

15. The drive system of claim 14, wherein the first and second planetary gearsets are mounted downstream of the electric motor.

16. The drive system of claim 14, wherein the first and second planetary gearsets are mounted upstream of the electric motor.

17. The drive system of claim 16, wherein the output shaft passes through the input shaft and the electric motor to engage the drive axle.

18. The drive system of claim 1, comprising:
an electric motor; and
a drive axle passing through a housing, wherein the housing at least partially surrounds the first and second planetary gearsets, and the output shaft.

19. The drive system of claim 18, wherein the first and second planetary gearsets are mounted downstream of the electric motor.

20. The drive system of claim 18, wherein the first and second planetary gearsets are mounted upstream of the electric motor.

21. The drive system of claim 1, comprising:
an electric motor, wherein the electric motor and the first and second planetary gearsets are mounted axially on a common axis that is parallel to a drive axle.

22. The drive system of claim 21, comprising:
at least two ground engaging elements mounted to the drive axle, wherein the electric motor and the first and second planetary gearsets are mounted between the at least two ground engaging elements.

23. The drive system of claim 22, wherein the output shaft passes through the input shaft and the electric motor to engage with the drive axle.

24. The drive system of claim 21, wherein the output shaft and the input shaft and the electric motor are aligned on a common axis of rotation with the drive axle.

25. The drive system of claim 1, comprising:
a housing configured to retain the first and second planetary gearsets, wherein a drive axle extends away from the housing to engage at least two ground engaging elements, and wherein the input shaft and the drive axle rotate on separate axes of rotation that are parallel to each other.

26. The drive system of claim 1, wherein the first brake, second brake, and clutch area upstream of the first and second planetary gearsets.

* * * * *